(12) United States Patent  (10) Patent No.: US 6,439,829 B1
Johnson                    (45) Date of Patent:    Aug. 27, 2002

(54) APPARATUS FOR PLACING SPACERS IN STACKED LUMBER

(76) Inventor: Robert C. Johnson, 810 Moog Ave., Bay Minette, AL (US) 36507

( * ) Notice: Subject to any disclaimer, the term of this patent is extended or adjusted under 35 U.S.C. 154(b) by 0 days.

(21) Appl. No.: 09/593,099

(22) Filed: Jun. 13, 2000

Related U.S. Application Data

(60) Provisional application No. 60/139,473, filed on Jun. 17, 1999.

(51) Int. Cl.$^7$ .............................................. B65G 57/02
(52) U.S. Cl. ................. 414/789.5; 198/367; 198/468.4; 414/792.7; 221/94
(58) Field of Search .......................... 414/789.5, 792.7; 221/94; 198/367, 468.4

(56) References Cited

U.S. PATENT DOCUMENTS

| 1,705,570 A |   | 3/1929  | Horstkotte |          |
|-------------|---|---------|------------|----------|
| 3,738,510 A |   | 6/1973  | Mason      |          |
| 3,848,757 A | * | 11/1974 | Jordan ..................... | 414/789.5 |
| 3,894,625 A |   | 7/1975  | Boyle et al. |         |
| 4,067,455 A | * | 1/1978  | Rysti ......................... | 214/6 H |
| 4,067,457 A | * | 1/1978  | Schiepe ................... | 414/789.5 |
| 4,144,976 A | * | 3/1979  | Rysti ......................... | 198/680 |
| 4,229,133 A | * | 10/1980 | Johnson ..................... | 193/1 |
| 4,253,787 A | * | 3/1981  | Lunden et al. ........... | 414/789.5 |
| 4,260,877 A | * | 4/1981  | Conway .................... | 209/519 |
| 4,264,253 A | * | 4/1981  | Kennison ................... | 221/266 |
| 4,310,274 A | * | 1/1982  | Moseley ................... | 414/789.5 |
| 4,324,520 A |   | 4/1982  | Kjellberg |          |
| 4,334,346 A | * | 6/1982  | Jensen ........................ | 156/92 |
| 4,360,303 A | * | 11/1982 | Rysti ......................... | 198/680 |
| 4,610,360 A |   | 9/1986  | Forslund |          |
| 4,632,621 A | * | 12/1986 | Cable ........................ | 206/499 |
| 4,762,665 A | * | 8/1988  | Billington et al. ......... | 209/579 |
| 4,790,706 A | * | 12/1988 | Elhaus .................... | 414/789.5 |
| 4,801,233 A | * | 1/1989  | Ritola ....................... | 221/298 |
| 4,810,152 A | * | 3/1989  | Gillingham et al. ........ | 198/367 |
| 4,822,231 A | * | 4/1989  | Morris, Jr. ................ | 198/369.2 |
| 4,852,029 A | * | 7/1989  | Pope et al. .................. | 209/521 |
| 4,878,803 A |   | 11/1989 | Whiddon |           |
| 5,244,341 A | * | 9/1993  | Dion et al. .............. | 414/789.5 |
| 5,246,333 A | * | 9/1993  | Bowlin ..................... | 414/789.5 |
| 5,263,812 A | * | 11/1993 | Bowlin ..................... | 414/789.5 |
| 5,350,272 A |   | 9/1994  | Bowlin |              |
| 5,580,212 A | * | 12/1996 | Andersson et al. ...... | 414/789.5 |
| 5,636,965 A |   | 6/1997  | Newnes et al. |       |
| 5,720,592 A | * | 2/1998  | Gillingham et al. ..... | 414/789.5 |
| 5,863,176 A | * | 1/1999  | Newnes et al. .......... | 414/789.5 |
| 5,960,104 A | * | 9/1999  | Conners et al. ............. | 144/402 |
| 5,993,145 A | * | 11/1999 | Lunden ................... | 414/789.5 |
| 6,007,295 A | * | 12/1999 | Sears et al. ............... | 414/789.5 |
| 6,048,164 A | * | 4/2000  | Ritola ...................... | 414/789.5 |
| 6,065,927 A | * | 5/2000  | Baron et al. ................ | 198/692 |
| 6,189,679 B1 | * | 2/2001 | Grinder .................... | 198/419.1 |
| 6,238,174 B1 | * | 5/2001 | Faerber ...................... | 403/220 |

FOREIGN PATENT DOCUMENTS

| CA | 875941 | 7/1971 | | |
| CA | 955970 | 10/1974 | | |
| WO | WO 00/78652 A1 | * 12/2000 | ........... | B65G/57/02 |

* cited by examiner

Primary Examiner—Christopher P. Ellis
Assistant Examiner—Jeffrey A. Shapiro
(74) Attorney, Agent, or Firm—Richard C. Litman

(57) ABSTRACT

An apparatus for placing spacer sticks between layers of lumber is disclosed. The present invention includes an overheads feed system for distributing spacer sticks to a plurality of stick placement modules. Each stick placement module has a plurality of stick placement arms which are articulated to move in three dimensions. After the arms grasp a spacer stick, the deviation of the arms from their normal orientations are used to gauge the suitability of the spacer stick and then to reject the spacer stick if the quality of the spacer stick does not meet specifications. Also, the apparatus of the present invention is modular and can be retrofitted to existing lumber stacking machines.

17 Claims, 10 Drawing Sheets

APPARATUS FOR PLACING SPACERS IN STACKED LUMBER

CROSS-REFERENCE TO RELATED APPLICATION

This application claims the benefit of U.S. Provisional Patent Application Ser. No. 60/139,473, filed Jun. 17, 1999.

BACKGROUND OF THE INVENTION

1. Field of the Invention

The present invention relates to an apparatus for placing spacer sticks between layers of lumber as the layers of lumber are stacked.

2. Description of Related Art

In the lumber industry green cut lumber is normally dried by forming the lumber into stacks which are then subjected to a drying process. In preparation for the drying process the lumber is first sorted into uniform sizes and then the lumber is arranged into layers. The layers of lumber are then stacked on top of each other with spacer or separation sticks being placed between the layers of lumber. The spacer sticks are elongated pieces of wood with rectangular cross sections. In the past it has been the practice to place the spacer sticks on each layer of lumber manually. Typically, the sorted lumber that has been arranged into a package is sent to a stacking machine. The stacking machine functions to make a single layer of lumber generally eight feet wide and, depending on the length of the lumber, about six to twenty four feet long. The stacking machine will place each layer on top of one another, on an auto indexing, downward moving stack support.

The separating sticks, used in-between each layer lumber would be set in manually by 2–6 workers depending on the length of the lumber and the users desired cycle time for each stack of lumber. The stick placing personnel stand opposite the direction of travel of the layer of lumber. The personnel set in place sticks that are ¾" thick by 1½" wide by 8 feet long, approximately one to two feet apart, on each layer of lumber. This is repeated until the stack reaches maximum height. Once maximum height is reached, the finished stack of lumber is removed from the stack support and a new stack is started.

Keeping the above process in mind, it is hard if not impossible to obtain consistent, repeatable performance from personnel having varying physical abilities and levels of experience. This inconsistency in performance has an adverse effect on the total output of industrial operations. Furthermore, personnel are in a semi-hazardous position as lumber being stacked has a tendency to skew, fall, or move without warning. Personnel have and do continue to be injured in this process.

For the foregoing reasons, machines that automatically place spacer sticks on layers of lumber have been proposed in the art. Listed below are some examples of stick placing machines that have been proposed in the art. U.S. Pat. No. 1,705,570, issued to Frederick W. Horstkotte on Mar. 19, 1929, U.S. Pat. No. 3,738,510, issued to Howard C. Mason on Jun. 12, 1973, U.S. Pat. No. 4,229,133, issued to Charles L. Johnson on Oct. 21, 1980, U.S. Pat. No. 4,324,520, issued to Jan E. Kjellberg on Apr. 13, 1982, U.S. Pat. No. 4,610, 360, issued to Hasse Forslund on Sep. 9, 1986, U.S. Pat. No. 4,801,233, issued to Edward Ritola on Jan. 31, 1989, U.S. Pat. No. 4,810,152, issued to Larry A. Gillingham et al. on Mar. 7, 1989, U.S. Pat. No. 4,878,803, issued to Wade Q. Whiddon on Nov. 7, 1989, U.S. Pat. No. 5,350,272, issued to William P. Bowlin on Sep. 27, 1994, U.S. Pat. No. 5,636,965, issued to William R. Newnes et al. on Jun. 10, 1997, Canadian Patent Number 875941, issued to Ray W. Newnes et al. on Jul. 20, 1971, and Canadian Patent Number 955970, issued to Alpo Rysti on Oct. 8, 1974, all show machines for placing spacer sticks in stacks of lumber. U.S. Pat. No. 3,894,625, issued to John S. Boyle et al. on Jul. 15, 1975, shows a lumber sorting system with overhead feed.

The automated stick placing machines proposed to date suffer from the drawback that these machines are not very tolerant of sticks that may be slightly warped. In other words, the machines proposed to date require sticks that are very straight and flat in order to feed into the machine without causing malfunctions. Therefore, the need persists in the art for a stick placing machine which is tolerant of slight warpage in the sticks being fed into the machine. Also, the need persists for a stick placing machine that can be retrofitted to existing lumber stacking machines and that is modular in construction to allow the machine to be custom tailored to a user's needs without having an exorbitant price.

None of the above inventions and patents, taken either singly or in combination, is seen to describe the instant invention as claimed. In particular, none of the above references teach or suggest the unique structural features of the stick placing machine of the present invention. Further, none of the prior stick placing machines are capable of reliably setting in place, between layers of lumber, warped, twisted, crooked, and/or bowed separation sticks (as allowed by the requirements of the particular type of stacking operation) and also rejecting separation sticks whose condition is not in compliance with the applicable restrictions regarding acceptable stick conditions.

SUMMARY OF THE INVENTION

The present invention is directed to an apparatus for placing spacer sticks between layers of lumber as the layers of lumber are stacked. The present invention includes an overhead feed system for distributing spacer sticks to a plurality of stick placement modules. Each stick placement module has an internal chain conveyer system which carries spacer sticks from the overhead feed system to a positioner system which positions the spacer stick such that the spacer stick can be grasped by a plurality of stick placement arms. The stick placement arms have pneumatic or hydraulic cylinders which allow the stick placement arms to extend and retract. One end of each of the placement arm cylinders is pivotally supported within the respective stick placement module. The pivotally supported end of each placement arm cylinder is allowed some travel along the direction of the longitudinal axis of the placement arm cylinder. The placement arms are mounted such that they extend downward to make contact with and grasp the spacer stick. Contact with the spacer stick is detected when the pivotally supported end of each placement arm cylinder manifests some movement along the direction of the longitudinal axis of the placement arm cylinder, and further extension of the placement arm is stopped upon detection of contact with the spacer stick. The pivotal mounting of the placement arm cylinders allows the longitudinal axes of the placement arms to deviate from the vertical as required for grasping the spacer stick. The placement arms' deviation from the vertical and the amount of extension of each of the placement arms are indicators of the warpage in the spacer stick. The spacer stick is rejected if the deviation of the placement arms from the vertical and/or the amount of extension of the placement arms, relative to the amount of extension of the placement arms for grasping an unwarped spacer stick, is beyond tolerable limits.

Accordingly, it is a principal object of the invention to provide an apparatus for placing spacer sticks between layers of lumber.

It is another object of the invention to provide an apparatus for placing spacer sticks between layers of lumber which is modular in construction.

It is a further object of the invention to provide an apparatus for positive delivery of the spacer sticks to their destination module and ultimately to the correct position on the lumber.

It is a further object of the invention to provide an apparatus for placing spacer sticks between layers of lumber which can be retrofitted to existing lumber stacking machines.

Still another object of the invention is to provide an apparatus for placing spacer sticks between layers of lumber which is capable of automatically rejecting spacer sticks which fail to meet applicable requirements.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Referring to FIGS. 1–6, the present invention is directed to an apparatus 10 for placing spacers or separation sticks 12 between layers 14 in a stack of lumber 16. The apparatus 10 is designed to be retrofitted to existing lumber stacking machines, or the apparatus 10 may be incorporated into newly built lumber stacking machines. The apparatus 10 is an enhancement to conventional lumber stacking machines.

Figure 1:
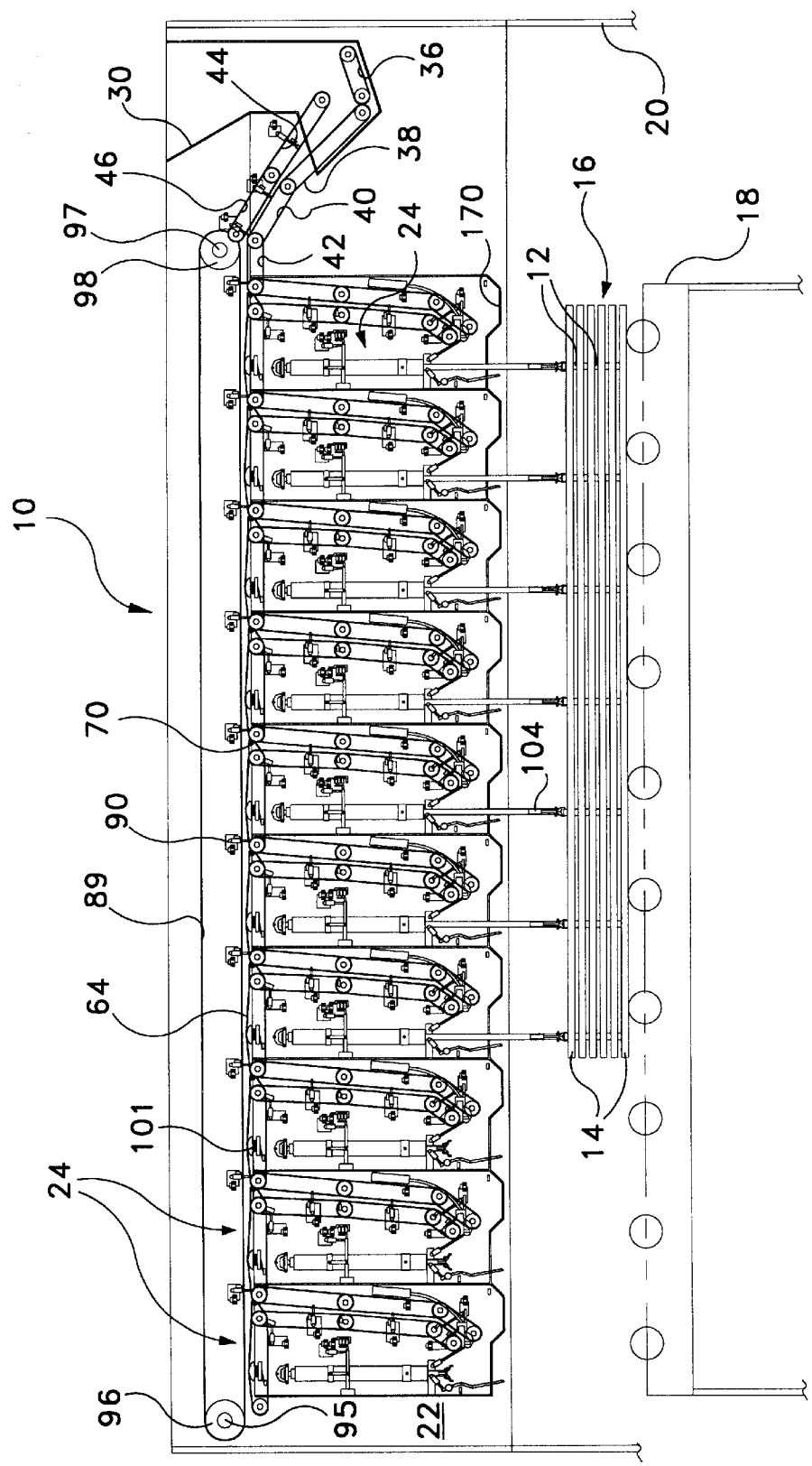
FIG. 1 is a side cross sectional view of an apparatus for placing spacers in stacked lumber according to the present invention, showing the apparatus in relation to a stack of lumber being formed.

Some of the elements that are common to conventional lumber stacking machines can be seen in FIG. 1. Conventional lumber stacking machines function to form a stack 16 made from layers of lumber 14. The term "lumber" as used herein refers to any type of elongated, wooden material including, for example, wooden boards or wooden beams such as two-by-fours. The pieces of lumber forming each particular stack of lumber are generally all of the same type and size, however, stacking machines can stack a variety of sizes and lengths of lumber. The conventional stacking machines have means (not shown) for arranging lumber into layers 14. Each layer of lumber 14 is formed by positioning a plurality of pieces of lumber in parallel to one another to form a horizontal row of pieces of lumber. Each layer of lumber 14 is generally eight feet wide and between six to twenty four feet long. The conventional stacking machines also have means (not shown) for conveying each completed layer 14 to a stack support 18. The stack support 18 is indexed such that it is automatically lowered a predetermined amount before each new layer of lumber is added to the stack so that each succeeding layer of lumber can move onto the top of the stack 16 without interference from the preceding layer of lumber.

The separation sticks 12 are positioned between the layers of lumber manually by two to six people, depending on length of the lumber and the rate at which the layers of lumber are stacked (normally six to twelve layers per minute). The stick placing personnel place sticks 12 on top of each layer of lumber at regular intervals along the length of each layer. Each stick 12 is three quarters of an inch thick by one and a half inches wide by eight feet long. The dimensions given for the sticks 12 are approximate. The sticks 12 are positioned such that they extend in a direction perpendicular to the longitudinal axes of the pieces of lumber that make up each layer of lumber 14. The process of adding layers of lumber to the stack 16 is repeated until the maximum desired stack height is reached. Once a stack reaches maximum height, the completed stack of lumber is removed from the support 18 and a new stack of lumber is started.

The apparatus 10 is designed to take over or automate the process of placing the separation sticks 12. The apparatus 10 is supported over the stack support 18 by support members 20. The apparatus 10 is supported over the stack support 18 in a manner such that the apparatus 10 will not interfere with the process of adding layers of lumber to the stack 16.

Figure 2:
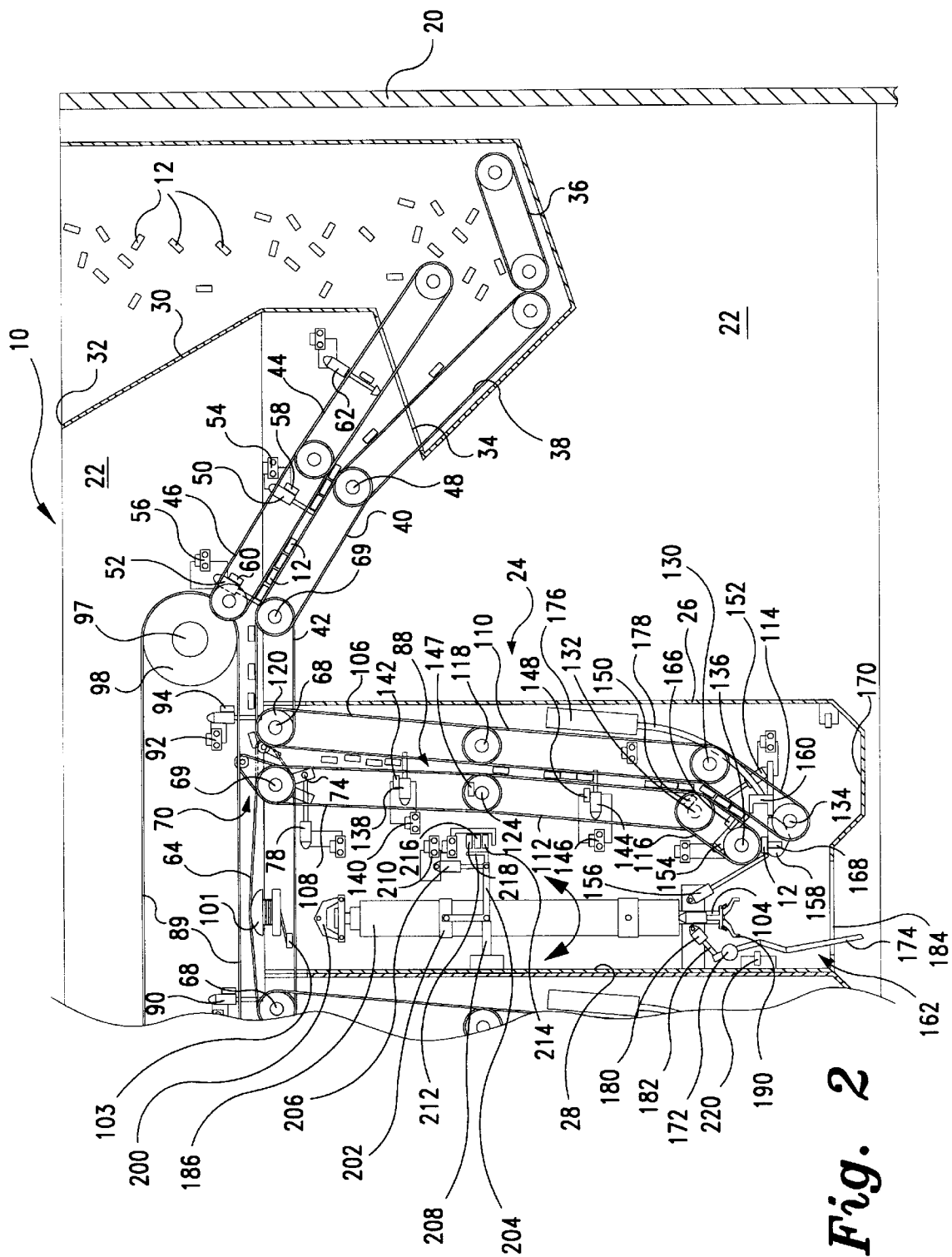
FIG. 2 is a fragmentary detail view of a stick placement module of an apparatus for placing spacers in stacked lumber according to the present invention.
Figure 3:
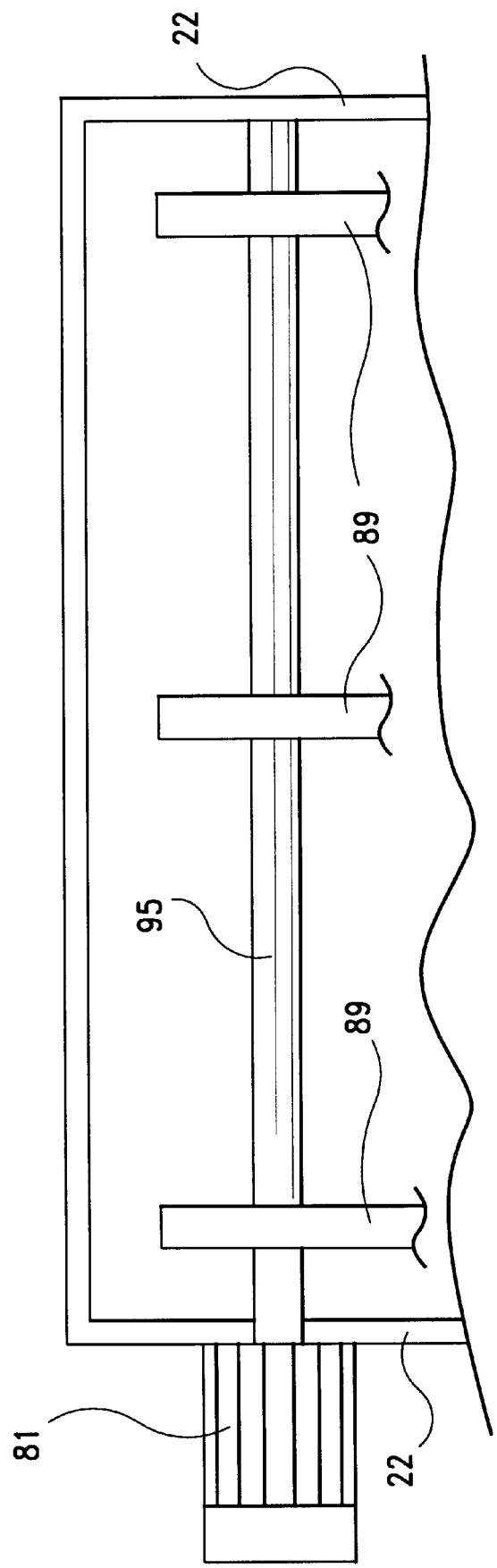
FIG. 3 is a fragmentary top view of the top feed chains of a stick placement module of an apparatus for placing spacers in stacked lumber according to the present invention.
Figure 4:
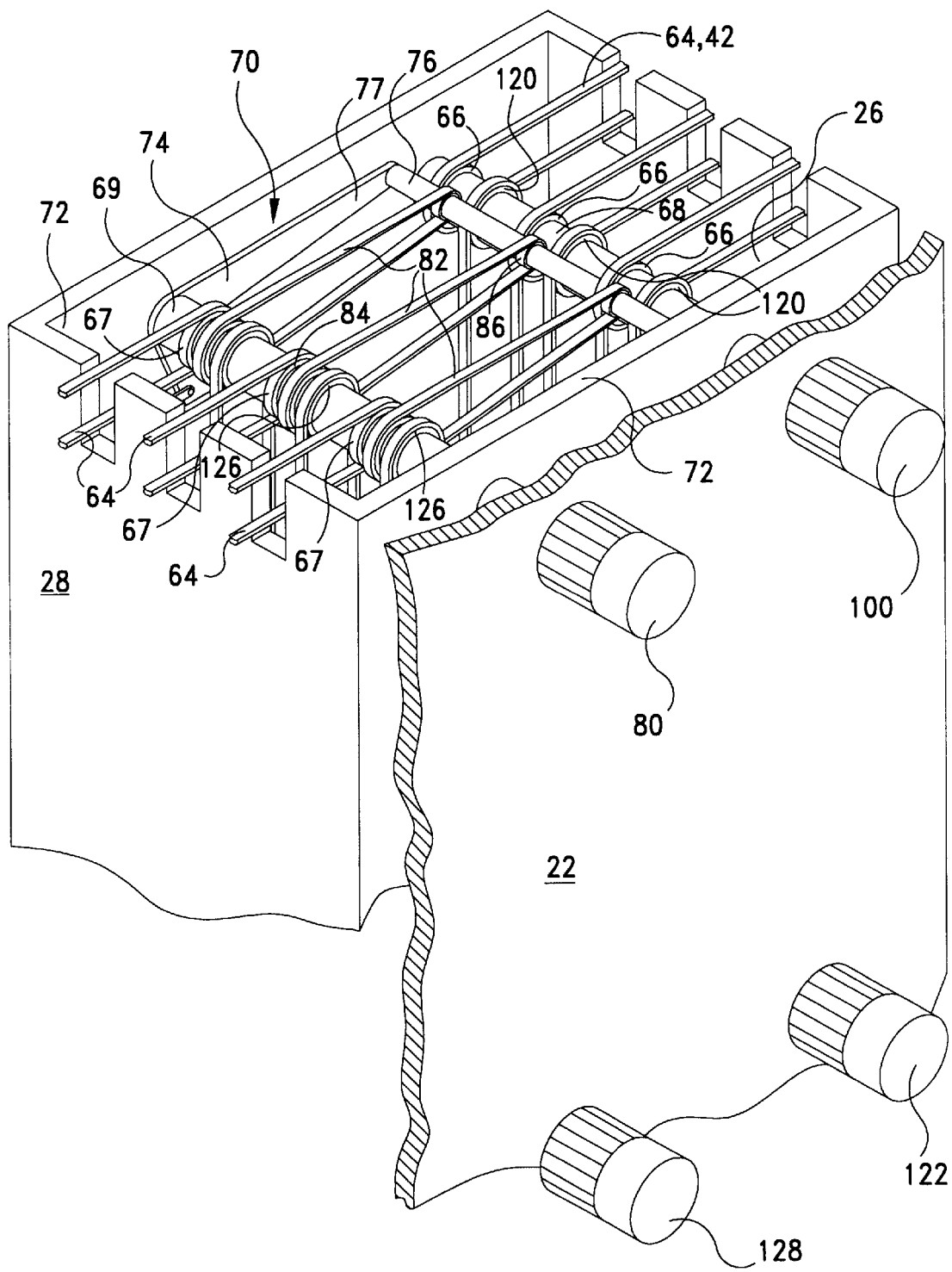
FIG. 4 is a fragmentary detail view of the top portion of a stick placement module of an apparatus for placing spacers in stacked lumber according to the present invention.
Figure 5:
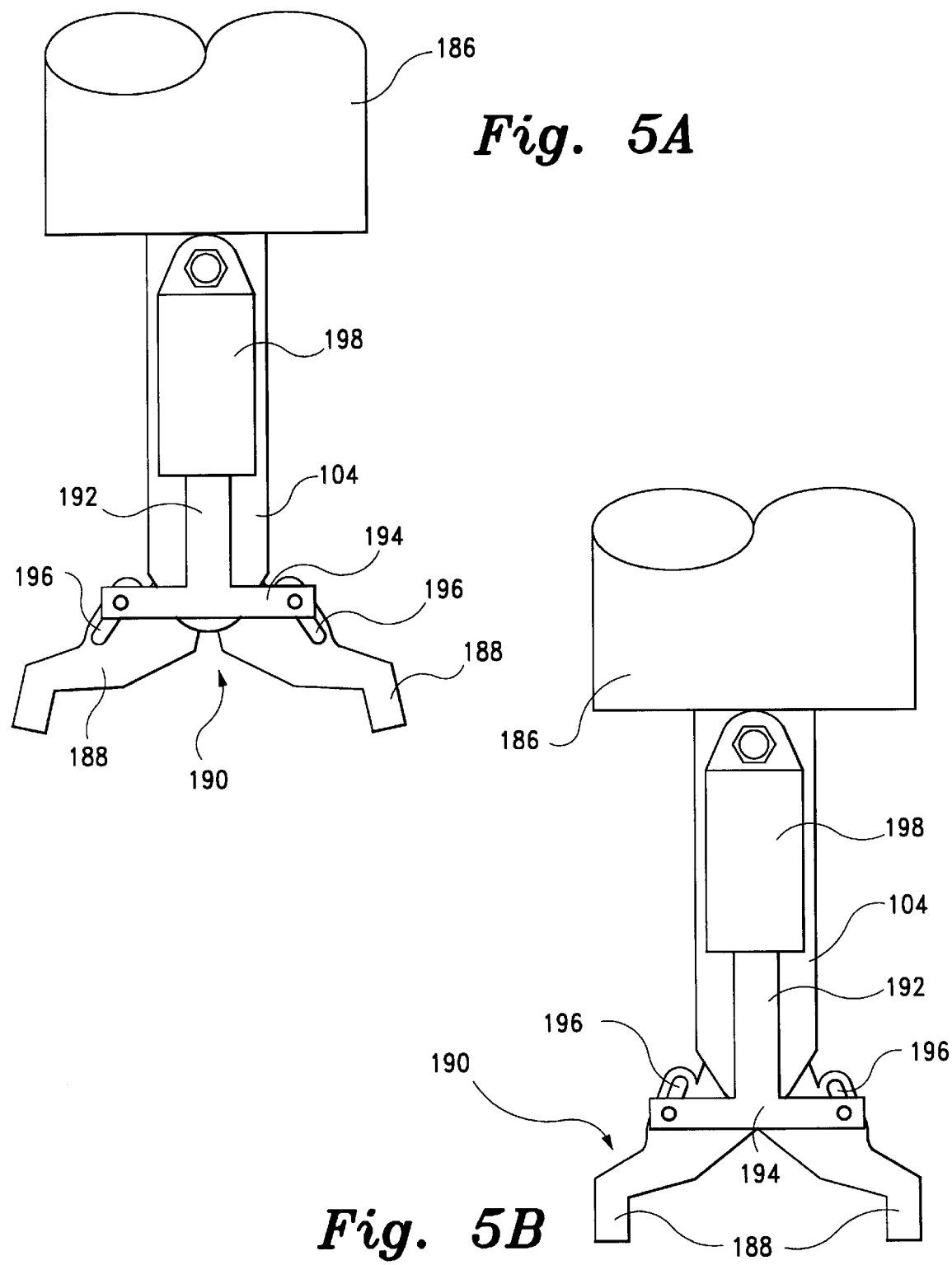
FIG. 5A is a fragmentary detail view of the stick grasping pincer of an apparatus for placing spacers in stacked lumber according to the present invention, shown in the open position.
FIG. 5B is a fragmentary detail view of the stick grasping pincer of an apparatus for placing spacers in stacked lumber according to the present invention, shown in the closed position.
Figure 6:
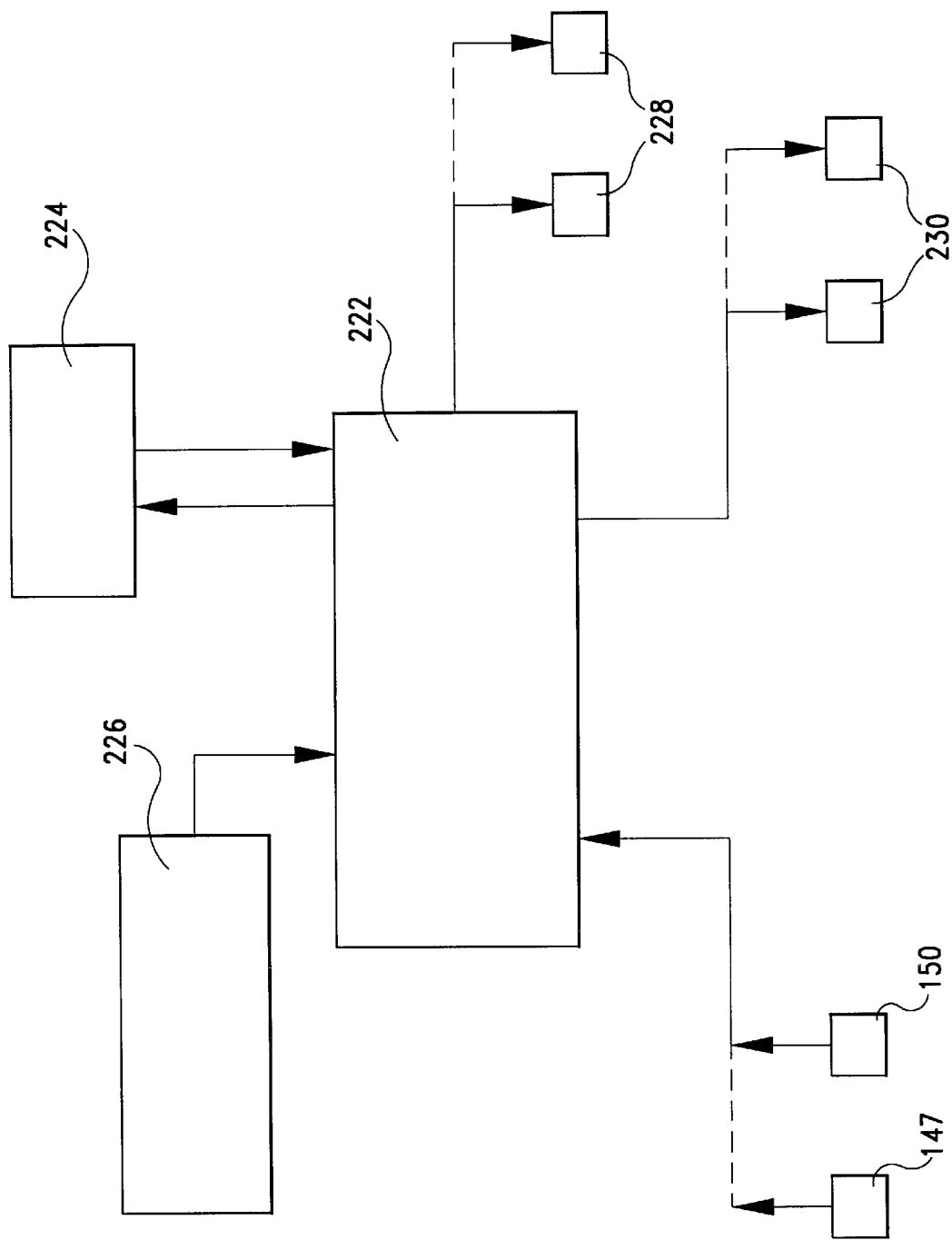
FIG. 6 is a schematic diagram of the control system of an apparatus for placing spacers in stacked lumber according to the present invention.

The apparatus 10 has a frame including a pair of parallel walls 22. Only one is of the parallel walls 22 is shown in FIGS. 1 and 2. The walls 22 are spaced apart, parallel, and cover about the same area when viewed from the side (i.e. when viewed from the same vantage point as used in FIG. 1). The support members 20 are attached to the walls 22. A plurality of separation stick placement modules 24 are provided in a row intermediate the walls 22. The number of modules 24 is determined by the longest lumber that the apparatus 10 is intended to accommodate and the desired spacing between the separation sticks 12. The apparatus 10 should be positioned above the stack support 18 at a height which allows a clearance in the range of 1 ft to approximately 2.3 ft between the bottom of walls 22 and the topmost layer of lumber in the highest stack of lumber anticipated to be formed by the lumber stacking machine which includes the apparatus 10.

The apparatus 10 is designed to place separation sticks 12 between each layer of lumber 14 in accordance with the specifications of the ultimate user of the apparatus 10. Also, the apparatus 10 is designed to deliver separation sticks consistently, with a minimum of human supervision and to dynamically grade each stick 12 in the process.

The apparatus 10 is modular in design for several reasons. First, the apparatus 10 should have enough flexibility to accommodate each user's specific needs without the need to redesign the major components of the apparatus 10. Each user's specific needs will vary depending upon the dimensions of the lumber, the size of the stack-desired, the dimensions of the separation sticks 12 used by each specific user, and the spacing between each neighboring pair of separation sticks desired by each specific user. Second, modular construction makes retrofitting the apparatus 10 to existing stacking machines easier as there are several different variations of stacking machines. Third, modular construction reduces the cost of manufacturing and reduces the cost to the user by reducing downtime and repair costs as malfunctioning modules are easily swapped for functional modules. Furthermore, the apparatus 10 should be adjustable to accommodate varying lumber dimensions, stack sizes, and separation stick dimensions within limits specified by each specific user.

Each placement module 24 has its own sub-frame which includes walls 26 and 28 which span the distance between the walls 22. The placement modules 24 should be as narrow as possible while still allowing enough room to accomplish the functions required of each placement module 24, to thereby afford the maximum amount of adjustability in the spacing between each neighboring pair of separation sticks 12. Further, the position of the placement modules 24 along the length of the walls 22 can be varied to adjust the spacing between each neighboring pair of separation sticks 12 in accordance with user specifications. The maximum width of each module 24, as measured between the walls 26 and 28, should be no more than approximately 1.5 feet. This module dimension allows for an adjustment of approximately 6 inches in the centerline-to-centerline spacing between each neighboring pair of separation sticks 12. Ultimately, the design goal is for the maximum width of each module 24, as measured between the walls 26 and 28, to be no more than about 1 foot. Each placement module 24 is a complete unit unto itself, and all placement module mechanical and electrical components (pneumatic actuators, valves, and sensors) for each placement module 24 are housed within each placement module's own sub-frame.

Although in the illustrated example the sub-frame of each module 24 is formed by the walls 26, 28, and 72, it is also possible for the sub-frame of each module 24 to be made entirely of beams with only the outer walls 22 covering the apparatus 10.

At one end of the frame including the walls 22 is an infeed hopper 30. The infeed hopper 30 is positioned intermediate the walls 22 and spans the dimension between the walls 22. The infeed hopper 30 has a top opening 32 and a side opening 34. The top opening 32 acts as a funnel guiding separation sticks 12 toward the landing chains 36. The landing chains 36 are actually three chains running in parallel and which are distributed along the dimension spanning the distance between the walls 22. The landing chains 36 convey the separation sticks to a first set of lower feed chains 38. Again, the first set of lower feed chains 38 are actually three chains running in parallel and which are distributed along the dimension spanning the distance between the walls 22. The first set of lower feed chains 38 conveys the separation sticks 12 to a second set of lower feed chains 40. Again, the second set of lower feed chains 40 are actually three chains running in parallel and which are distributed along the dimension spanning the distance between the walls 22. The feed chains 38 and 40 are coupled together to form a continuous train conveying separation sticks to the first module feed chains 42. The first module feed chains 42 are again a set of three chains. The lower feed chains 38 and 40 can be operated in the forward and reverse directions. Similarly, the landing chains 36 can be operated in the forward or reverse directions.

Positioned above the first set of lower feed chains 38 are a first set of upper feed chains 44, and positioned above the second set of lower feed chains 40 are a second set of upper feed chains 46. The chains 44 and 46 are provided in sets of three. The feed chains 44 and 46 are decoupled from one another such that the chains 44 and 46 can run in the forward or reverse directions independent of each other. The chains 40 and 46 are spaced apart so as to accommodate the thickness of only a single layer of separation sticks. With both the chains 40 and 46 running in the forward direction, separation sticks positioned intermediate the chains 40 and 46 will be conveyed to the first module feed chains 42. The spacing between the chains 38 and 44 decreases with decreasing distance from the shaft 48. If separation sticks moving up the chains 38 become piled on top of one another, running the chain 44 in reverse will break up the pile of separation sticks, thus ensuring that a single layer of separation sticks reaches the chains 40 and 46. The chains 38 and 44 pass out of the hopper 30 through the side opening 34.

Pneumatically actuated stop hooks 50 and 52, supported by the frame members 54 and 56 which extend between the walls 22, are located along the path of the separation sticks 12 to the first module feed chains 42. When actuated, the stop hooks 50 and 52 move into the path of the separation sticks 12 such that movement of the separation sticks from one side of the stop hooks to the other is prevented. The stop hooks 50 and 52 are used to hold the separation sticks 12 in either the forward or reverse chain directions to aid in the accumulation of separation sticks and in the correction of the orientation of the separation sticks. The stop hooks 50 and 52 ensure that the separation sticks 12 are oriented with their longitudinal axes perpendicular to the direction of movement of the chains 40 and 46.

In operation, a bundle of separation sticks 12 are placed in the hopper 30 with the chains 36, 38, 40, and 46 running in the forward direction. The separation sticks 12 will land on the landing chain 36 which is running in the forward direction. The chains 36 convey the separation sticks 12 to the chains 38 which in turn convey the separation sticks to the chains 40. The first upper set of feed chains 44 run in reverse to knock separation sticks that are piled atop other separation sticks down the chains 38 and thus ensure that a single layer of separation sticks will reach the chains 40 and 46. The chains 38 and 40 may be provided with hold-downs to help in the conveying, isolation, and alignment of the separation sticks 12. The separation sticks 12 continue to travel into the secondary chains 40 and 46 which with the aid of the stop hooks 50 and 52 feed the separation sticks into the first module feed chains 42. Sensors 58 and 60 which are located adjacent the stop hooks 50 and 52, respectively, provide an indication of whether or not a misalignment or a skewing of a separation stick has occurred among the separation sticks being conveyed to the feed chains 42 of the first placement module 24. The secondary chains 40 and 46 will rotate forward and reverse in response to the output of sensors 58 and 60, and thus the chains 40 and 46 will correct the separation stick alignment in cooperation with the stop hooks 50 and 52. Should the attempt to correct the separation stick alignment be unsuccessful, the secondary chains 40 and 46 will go through the stick misalignment correction cycle a predetermined number of times in cooperation with the stop hooks 50 and 52. At this point, if the problem is not corrected the hopper chains 38 and 44 and the secondary chains 40 and 46 will run in reverse in an attempt to clear the feed problem. Next, the normal feeding cycle will be attempted again to ascertain if the separation sticks will feed normally. Should the problem still persist, the hopper feed chains 36, 38, and 44 will stop and the operator will be alerted through some type of warning indicator that operator intervention is necessary in order to resume normal functioning. The pneumatic tensioner 62 is used to vary the clearance between the chains 38 and 44 in order to aid in reducing piles of separation sticks on the chains 38 to a single layer.

Although in the illustrated example the infeed hopper 30 is an integral part of the apparatus 10, the infeed hopper 30 can be a separate unit if desired. If the infeed hopper 30 is a separate unit, then the infeed hopper 30 is placed at the end of the apparatus 10 proximate the feed chains 42 such that the in feed hopper 30 can feed spacer sticks 12 to the first placement module 24. With the infeed hopper 30 made as a separate unit, the walls 22 will no longer extend to surround the infeed hopper 30.

As another added feature tie cutters (not shown) can be provided along the chains 36, 38, 40, or 42. Tie cutters would allow the spacer sticks 12 to be fed in bundles, that are held together by ties, to the infeed hopper 30. The tie cutters would then cut the ties automatically and allow the breaking up of the bundle before the spacer sticks 12 are fed to the placement modules 24.

Each placement module 24, except the first module, has a set of feed chains 64. Each set of feed chains 64 is actually a set of three feed chains running in parallel. The feed chains 42 of the first placement module are distinguished from the feed chains 64 only in that the feed chains 42 may be shorter than the feed chains 64. The feed chains 64 and 42 are located about the open tops of the placement modules 24 and are supported by various shafts substantially extending the entire span intermediate the walls 22.

Each of the chains 64 and 42 is in the form of an endless loop extending between a respective pair of sprockets 66 and 67 which are supported on a respective pair of shafts 68 and 69. Except for the first placement module 24, the greater portions of the feed chains 64 of each placement module 24 extend over the open top of the preceding placement module 24, however, the portions of the feed chains 64 engaging the downstream sprockets 66, of the respective pairs of sprockets 66 and 67, are positioned over the open top of their respective placement module 24. Each of the feed chains 42 extends between a respective pair of sprockets 66 and 67 with the portions of the feed chains 42 engaging the respective downstream sprockets 66 being positioned over the open top of the first placement module 24.

The feed chains 64 and 42 convey separation sticks 12 to their respective placement modules 24. Each stick placement module 24 has a stick gate 70. The stick gate 70 is formed in part by a respective one of the shafts 69 located above the open top of the respective placement module 24. The shaft 69 is rotatably supported between the sidewalls 72 of the placement module 24. A pair of L-shaped pivot arms 74 (only one shown) are pivotally supported at either end of the shaft 69 such that the rotation of the shaft 69 is independent of the pivotal movement of the L-shaped pivot arms 74. A respective shaft 76 is rotatably supported intermediated the distal ends 77 of the longer portions of the L-shaped pivot arms 74. Pivotal movement of the L-shaped pivot arms 74 causes the shaft 76 to move in an arc, however, the pivotal movement of the L-shaped pivot arms 74 in no way affects the rotational motion of the shafts 69 and 76.

A pair of pneumatic actuators 78 selectively cause the L-shaped pivot arms 74 to move pivotally. The electric motor 80 selectively causes the rotational motion of the shaft 69 in either the forward or the reverse direction. The stick gate 70 further includes three chains 82. The chains 82 are in the form of endless loops and each of the chains 82 engages a pair of sprockets 84 and 86. The sprockets 84 are keyed or otherwise fixed to the shaft 69 so as to rotate with the shaft 69. The sprockets 86 are supported by the shaft 76 and the sprockets 86 are free to rotate. Therefore the motor 80 can be used to selectively run the chains 82 in either the forward or the reverse direction.

When the stick gate 70 is closed, the upper side of the chains 82 bridge the gap between the sprockets 66 and 67, and the upper side of the chains 82 are level with the upper side of the module feed chains 64 (or 42 in the case of the first placement module 24). When a stick gate 70 is closed, separation sticks are conveyed over the respective module 24 and to the feed chains of the next module 24. When the pneumatic actuators 78 pivotally move the L-shaped arms 74 to the open position, the stick gate 70 opens to allow separation sticks being fed by the placement module feed chains (64 or 42) to pass down into the respective placement module 24.

In operation, when separation sticks are being delivered to a particular placement module 24, the respective stick gate 70 is raised up to allow the separation sticks 12 to be fed into chute 88. After the separation sticks are received into the chute 88, the respective stick gate 70 closes and separation sticks subsequently fed by the module feed chains (64 or 42) are passed to the feed chains of the placement module 24 that is next in line. When separation sticks are being passed over a stick gate 70 in the closed position, the motor 80 is used to run the chains 82 in either the forward or reverse directions to convey separation sticks from one set of module feed chains (64 or 42) to another set of module feed chains. To empty a particular placement module 24, the respective gate 70 is opened and the chains 82 are run in the forward direction (counter clockwise in the views in FIGS. 1, 2, and 4). The chains 82 are run in the reverse direction (clockwise in the views in FIGS. 1, 2, and 4) with the respective stick gate 70 open to feed separation sticks to the respective chute 88.

A set of top module feed chains 89 are provided above the chains 42, 64, and 82. The set of chains 89 include three chains running in parallel. The three chains 89 are distributed along the dimension extending between the walls 22.

Each of the chains 89 engages a pair of sprockets 96 and 98. The sprockets 96 are keyed or otherwise fixed to the shaft 95 so as to rotate with the shaft 95. The sprockets 98 are supported by the shaft 97 and the sprockets 98 are free to rotate. The motor 81 is used to run the chains 89 in either the forward or the reverse directions. At a certain point along each set of chains 64 a tensioner 101 pushes the chains 64 close to the chains 89. A sensor 103, attached to the tensioner 101 can detect if a separation stick is stacked on top of another. If such a condition is detected then the chains 89 are run in reverse (i.e. in the counter clockwise direction in the views of FIGS. 1 and 2) to unstack the separation sticks.

Before each stick gate 70, proceeding in a direction from the hopper 30 toward the last placement module 24, there is a set of pneumatic stop hooks 90. Each set of stop hooks 90 is supported by a frame member 92 which extends between the walls 22 above the respective module feed chains (64 or 42). The stop hooks 90 in each set of stop hooks are arranged three abreast along the length of the frame member 92. The stop hooks 90 can be lowered into the path of the separation sticks to ensure that the separation sticks are properly aligned (i.e. are oriented with their longitudinal axes perpendicular to the direction in which the module feed chains 64 or 42 are running) just before the separation sticks pass through an open stick gate 70. A sensor 94 is provided adjacent each stop hook 90 to ensure proper alignment of the separation sticks approaching an open stick gate 70. If a misalignment is detected, with the respective set of stop hooks 90 lowered to block the path of the separation sticks, the respective module feed chains 64 or 42 are run in reverse and then forward to bring the separation sticks into proper alignment.

The placement modules 24 are roughly in the shape of rectangular parallelepipeds having four sidewalls, an open top, and a partially enclosed bottom. The placement modules 24 are supported by the walls 22 such that the sidewalls 72 are parallel to and abut the walls 22 and the sidewalls 26 and 28 extend in parallel between the walls 22. Each placement module 24 is mounted at the same height as the other modules 24, and the placement modules 24 are parallel to each other. The relative positions of the modules 24 are adjustable to allow for variation of the spacing between the separation sticks placed on a layer of lumber. The variation in the spacing between the separation sticks is limited by the width (measured parallel to the walls 22) of the modules 24.

The purpose of each placement module 24 is to place a single separation stick 12 on each layer of lumber 14 with the longitudinal axis of the separation stick being perpendicular to the longitudinal axes of the lumber in each layer 14. In addition to the stick gate 70 and portions of the module feed chains 64 or 42 described previously, each module 24 houses a chute 88, stick positioners 160 and 162, and a pneumatically actuated stick placement arm 104 which is used to place a separating stick on each layer of lumber 14. Each module 14 further includes various pneumatic stop hooks, sensors, and actuators which are described in detail below. Most of the components shown in the side views of FIGS. 1 and 2 are provided in sets of three and are arranged three abreast along a direction perpendicular to the walls 22.

The Chute 88 is defined by six sets of chains 106, 108, 110, 112, 114, and 116. Each of the sets of chains 106, 108, 110, 112, 114, and 116 includes three chains arranged in parallel. Only one of the three chains in each of the sets of chains 106, 108, 110, 112, 114, and 116 can be seen in the side views of FIGS. 1 and 2, because the three chains in each set of chains are superimposed on one another when viewed from the side.

Each of the first set of chains 106 is placed around sprockets that are supported by the shafts 68 and 118. The sprockets 120, which are supported on shaft 68 and which are engaged to the chains 106, are supported by the shaft 68 in a manner that allows these sprockets to freewheel. Therefore, the chains 106 run independent of the module feed chains 64 or 42. Each module 24 has an electric motor 100 which powers the rotation of shaft 68 and thus powers the running of the chains 64 or 42 for each module 24 in either the forward or the reverse direction. The sprockets which are supported on shaft 118 and which are engaged to the chains 106, are fixed to and rotate with the shaft 118. The electric motor 122 powers the rotation of the shaft 118 and can be used to selectively run the chains 106 in either the forward or the reverse direction.

Each of the second set of chains 108 is placed around sprockets that are supported by the shafts 69 and 124. The sprockets 126, which are supported on shaft 69 and which are engaged to the chains 108, are supported by the shaft 69 in a manner that allows these sprockets to freewheel. Therefore, the chains 108 run independent of the stick gate chains 82. The sprockets which are supported on shaft 124 and which are engaged to the chains 108, are fixed to and rotate with the shaft 124. The electric motor 128 powers the rotation of the shaft 124 and can be used to selectively run the chains 108 in either the forward or reverse direction.

The chains 106 and 108 extend downward roughly vertically from the stick gate 70. The sets of chains 106 and 108 are positioned opposite one another such that the separation sticks 12 pass between the sets of chains 106 and 108.

Each of the third set of chains 110 is placed around sprockets that are supported by the shafts 118 and 130. The sprockets which are supported on shaft 118 and which are engaged to the chains 110, are supported on the shaft 118 in a manner such that they can rotate freely and independent of the shaft 118. The sprockets which are supported on shaft 130 and which are engaged to the chains 110, are fixed to and rotate with the shaft 130. An electric motor similar to the electric motor 122 powers the rotation of the shaft 130 and can be used to selectively run the chains 110 in either the forward or reverse direction.

Each of the fourth set of chains 112 is placed around sprockets that are supported by the shafts 124 and 132. The sprockets which are supported on shaft 124 and which are engaged to the chains 112, are supported by the shaft 124 in a manner that allows these sprockets to rotate freely and independent of the shaft 124. The sprockets which are supported on shaft 132 and which are engaged to the chains 112, are fixed to and rotate with the shaft 132. An electric motor similar to the electric motor 128 powers the rotation of the shaft 132 and can be used to selectively run the chains 112 in either the forward or reverse direction.

The chains 110 and 112 extend downward roughly vertically from the shafts 118 and 124. The sets of chains 110 and 112 are positioned opposite one another such that the separation sticks 12 pass between the sets of chains 110 and 112.

Each of the fifth set of chains 114 is placed around sprockets that are supported by the shafts 130 and 134. The sprockets which are supported on shaft 130 and which are engaged to the chains 114, can rotate independently of the shaft 130. The sprockets which are supported on shaft 134 and which are engaged to the chains 114, are fixed to and rotate with the shaft 134. An electric motor similar to the electric motor 122 powers the rotation of the shaft 134 and can be used to selectively run the chains 114 in either the forward or reverse direction.

Each of the sixth set of chains 116 is placed around sprockets that are supported by the shafts 132 and 136. The sprockets which are supported on shaft 132 and which are engaged to the chains 116, can rotate independently of the shaft 132. The sprockets which are supported on shaft 136 and which are engaged to the chains 116, are fixed to and rotate with the shaft 136. An electric motor similar to the electric motor 128 powers the rotation of the shaft 136 and can be used to selectively run the chains 116 in either the forward or reverse direction.

The chains 116 and 114 extend downward at an angle from the horizontal from the shafts 132 and 130. The sets of chains 114 and 116 are positioned opposite one another such that the separation sticks 12 pass between the sets of chains 114 and 116.

The chains 106 and 108 feed the separation sticks 12 to the chains 110 and 112 and provide a temporary separation stick storage to feed surges in demand for the separation sticks 12 during the stacking operation. Pneumatically actuated stop hooks 138 (arranged three abreast), supported by the member frame 140 of the module frame, are located such that when used they will hold the separation sticks 12 in either the forward or reverse chain direction to aid in accumulation of separation sticks 12 in the chute 88 and in correction of the separation stick orientation.

In operation, running the chains 106 and 108 in the forward direction will continue the feeding of separation sticks 12 into the portion of the chute 88 defined by the chains 110 and 112. If the portion of the chute 88 defined by the chains 110 and 112 is full, the chains 106 and 108 will stop and will feed separation sticks 12 only as needed using the stop hooks 138 to meter separation sticks 12 to the chains 110 and 112. Sensors 147, which may be of the optical type, generate a signal indicative of the fact that the portion of the chute 88 defined by the chains 110 and 112 is full. Adjacent the stop hook 138 is a sensor 142 which may, for example, be of the optical type. If the sensor 142 does not detect the presence of any separation sticks 12 above the stop hooks 138, a signal is generated which opens the respective sticks gate 70, closes stick gates between the particular module 24 and the chains 40 and 46, and starts running the chains 36, 38, 40, 44, 46, 42, and any necessary chains 64 and 82 such that a packet of 1 to 10 separation sticks 12 is fed to the chains 106 and 108.

Should a separation stick 12 become misaligned during or after delivery, as detected by the sensors 142, the stop hooks 138 are used to block the separation stick path while the chains 106 and 108 are run in reverse and then forward for several cycles. Ordinarily, this procedure should correct the misalignment. If the problem was not corrected by a predetermined number of reverse and forward cycles, the separation sticks 12 on the feed chains 40, 42, 64, and 82 will be captured by the closest stop hooks. The stick gate 70 of the particular module 24 having the misalignment problem, will open and both chains 106 and 108 and the chains 82 of the particular stick gate 70 will run in reverse to remove the misaligned separation stick 12 from the particular placement module 24 back onto the feed chains. If this condition occurs, the feed chains 38, 40, 42, 64, and 82 will work cooperatively to remove the problem separation stick 12 back to the hopper 30. If the procedure to remove the problem separation stick 12 back to the hopper fails, the feed chains will stop and the operator will be alerted through some type of warning indicator that operator intervention is necessary in order to resume normal operation of the apparatus. Once the fault is cleared, normal operation of the apparatus can then resume.

The chains 110 and 112 feed the separation sticks 12 to the chains 114 and 116 and provide a temporary separation stick storage to feed surges in demand for the separation sticks 12 during the stacking operation. Pneumatically actuated stop hooks 144 (arranged three abreast), supported by the member frame 146 of the module frame, are located such that when used they will hold the separation sticks 12 in either the forward or reverse chain direction to aid in accumulation of separation sticks 12 between the chains 110 and 112 and in correction of the separation stick orientation.

In operation, running the chains 110 and 112 in the forward direction will continue the feeding of separation sticks 12 into the portion of the chute 88 defined by the chains 114 and 116. If the portion of the chute 88 defined by the chains 114 and 116 is full, the chains 110 and 112 will stop and will feed separation sticks 12 only as needed using the stop hooks 144 to meter separation sticks 12 to the chains 114 and 116. Sensors 150, which may be of the optical type, generate a signal indicative of the fact that the portion of the chute 88 defined by the chains 114 and 116 is full. Adjacent each stop hook 144 is a sensor 148 which may, for example, be of the optical type. If the sensors 148 do not detect the presence of any separation sticks 12 above the stop hooks 144, a signal is generated which prompts the stop hook 138 to be withdrawn from the path of the separation sticks 12 and causes the chains 106 and 108 to be put in motion, thus allowing more separation sticks 12 to be fed to the chains 110 and 112.

Should a separation stick 12 become misaligned during or after delivery, as detected by the sensors. 148, the stop hooks 144 are used to block the separation stick path while the chains 110 and 112 are run in reverse and then forward for several cycles. Ordinarily, this procedure should correct the misalignment. If the problem was not corrected by a predetermined number of reverse and forward cycles, the separation sticks 12 on the feed chains 40, 42, 64, and 82 will be captured by the closest stop hooks. The stick gate 70 of the particular module 24 having the misalignment problem, will open and the chains 106, 108, 110, and 112 and the chains 82 of the particular stick gate 70 will run in reverse to remove the misaligned separation stick 12 from the particular placement module 24 back onto the feed chains. If this condition occurs, the feed chains 38, 40, 42, 64, and 82 will work cooperatively to remove the problem separation stick 12 back to the 12 back to the hopper fails, the feed chains will stop and the operator will be alerted through some type of warning indicator that operator intervention is necessary in order to resume normal operation of the apparatus. Once the fault is cleared, normal operation of the apparatus can then resume.

The chains 114 and 116 receive separation sticks 12 from the chains 110 and 112 and then present those separation sticks 12 individually to a set of stick positioners 160 and 162 which in turn position the stick 12 for grasping by the pincers 190 of a plurality of placement arms 104. A series of three sets of stop hooks 152, 154, and 156, supported by the module frame, ensure that one separation stick 12 at a time is placed on the platform 158 where the separation stick 12 can be engaged by the positioners 160 and 162.

In operation, when the chains 114 and 116 are running or moving in the forward direction, separation sticks 12 placed between the two sets of chains 114 and 116 are conveyed toward the platform 158. Three sets of stop hooks 152, 154, and 156 control the rate of movement of the separation sticks 12 between the two sets of chains 114 and 116, and the stop hooks also coordinate the movement of the separation sticks 12 with the movement of the placement arms 104 and the positioners 160 and 162.

A set of sensors 166 are positioned before the stop hooks 154 to detect if a separation stick 12 is being blocked or held by the stop hooks 154. A set of sensors 168 are positioned before the stop hooks 156 to detect if a separation stick 12 is being blocked or held by the stop hooks 156. Further, the sensors 166 and 168 can detect if a separation stick 12 positioned between the chains 114 and 116 is misaligned.

If any of the placement arms 104 and the positioners 160 and 162 are out of their starting positions, then the chains 114 and 116 will stop. If the sensors 166 and 168 indicate that the space between the chains 114 and 116 is filled with separation sticks 12, then the chains 110 and 112 stop running. If a misaligned stick 12 a is detected, then an appropriate one of the stop hooks 152, 154, and 156 is used to block the path of the misaligned separation stick 12. The chains 114 and 116 are then cycled in the reverse and forward directions, for a predetermined number of times, in an attempt to properly align the separation stick 12 such that its longitudinal axis will be oriented perpendicular to the direction of the chains 114 and 116. If the attempt to properly align the separation stick 12 fails, then the misaligned stick 12 is rejected and the chains 114 and 116 are run in the forward direction to eject the misaligned stick 12 out the downstream end of the chains 114 and 116. The positioner 162 is used to guide the rejected stick 12 to the reject trough 170 in a manner which will be described below.

The first stick positioner 160 is supported by the lower portion of the frame of the module 24. The first stick positioner 160 is mounted such that it can travel horizontally. The second stick positioner 162 is pivotally supported by a shaft 172 which extends between the walls 72 of the frame of the module 24. The shaft 172 is located in the lower portion of the frame of the stick placement module 24. The stick positioner 162 has a stick contacting arm 174 which moves in an arc as the stick positioner 162 pivots. As with most other components of the module 24, in actuality there are three positioners 160 distributed along the dimension extending between the sidewalls 72 of the module frame. Similarly, there are three positioners 162 distributed along the dimension extending between the sidewalls 72 of the module frame.

Each of the positioners 160 are actuated by a respective pneumatic cylinder 176 which moves its respective positioner 160 horizontally using a flexible rod 178. Each of the positioners 162 are actuated by a respective pneumatic cylinder 180 which moves its respective positioner 162 pivotally by having its rod 182 pivotally attached to a lever portion of the positioner 162.

The operating cycle of the positioners 160 and 162 starts with the positioners 160 and 162 in the positions illustrated in FIG. 2. At the start of the cycle, a stick 12 is being held in position at the output end of the chains 114 and 116 by the stop hooks 156 as shown in FIG. 2. Also, the placement arms 104 are in the retracted position with their pincers in the open position as shown in FIG. 2. The cycle starts with the positioners 160 moving away from the sidewall 26 to make contact with the stick 12. At this point the stop hook 156 is retracted allowing the positioners 160 and the stick 12 to move toward the positioners 162. At the same time, the positioners 162 begin to pivot such that their stick contacting arms 174 start to pivot upward so as to provide a backstop to the movement of the positioners 160. The movements of the positioners 160 and 162 continues until the positioners 160 opposingly contact the positioners 162 and cooperatively hold the stick 12 in position for the placement arms 104 to grasp using the pincers at the end of each placement arm 104.

Once the stick 12 is in position, the arms 104 extend downward until sensors near the pivot point of the cylinders 186 of the placement arms 104 (not shown) indicate that the pincers have contacted the stick 12. At this time the pincers close gripping the stick 12. A set of sensors in the pincers (also not shown) confirm that the pincers have gripped the stick 12. Confirmation that the stick 12 is firmly gripped by the pincers causes a signal to the positioners 160 and 162 to begin to move back to their starting positions.

Recall that the chains 114 and 116 are stopped as long as the positioners 160 are out of their starting positions. Also, the stop hook 154 prevents any spacer stick 12 from moving onto the platform 158. Once the positioners 160 and 162 have moved back to their starting positions, the way is clear for the arms 104 to move through the opening 184 at the bottom of the stick placement module 24 and deposit the separation stick on the layer of lumber.

Each module 24 further includes a minimum length sensor (not shown) which may be a very simple contact switch positioned at a distance just less than the minimum acceptable separation stick length, from a first one of the sidewalls 72. Mounted to the second sidewall 72 is an end positioner which is merely a plate which is movable toward the first sidewall 72 by any well known servo-mechanism. Each time a stick is held between the positioners 160 and 162, the end positioner moves from the second sidewall 72 toward the first sidewall 72 until the stick is trapped between the end positioner and the first sidewall 72. If the end positioner makes contact with the minimum length sensor, then the stick is shorter than the minimum acceptable length and the stick is rejected.

In addition, the positioners 162 are provided with contact sensors (not shown) which can detect whether or not the positioners 160 have reached their fully extended position where they are in contact with the contact sensors of the positioners 162. Each of the positioners 160 make contact with the sensor of each respective positioner 162 when the positioners 160 and 162 are holding a stick with warpage, crookedness, and bending that are within tolerable limits in position for grasping by the arms 104. It should be noted that the fact that the positioners 160 have reached their fully extended positions can alternatively be detected using contact sensors, in the form of simple contact switches, which are attached to the positioners 160 instead of the positioners 162. The positions of the contact sensors on either the positioners 160 or the positioners 162 are preferably adjustable in order to allow an end user to set the limits of acceptable stick deformation in accordance with the end user's particular requirements. If any of the positioners 160 fails to make contact with the contact sensor of its respective positioner 162, then the stick 12 is deformed beyond the acceptable limits and is rejected.

If the rejection of the stick 12 is indicated, the stop hooks 156 will move to their extended positions blocking the front of the platform 158. The positioners 160 will move back toward their starting positions while the positioners 162 will remain in their current position which is the position the positioners 162 would be in when presenting a stick to the arms 104. As the positioners 160 move back toward their starting positions, the stop hooks 156 will knock the rejected stick off the positioners 160 and on to the positioners 162. The positioners 162 then guide the rejected stick to the reject trough 170 under the influence of gravity.

The arms 104 move up and down due to the action of the pneumatic cylinders 186. The pneumatic cylinders 186 each have a first end and a second end. The first end of each cylinder 186 is closed and the second end of each cylinder 186 has an opening through which a respective one of the arms 104 passes. Each arm 104 moves, in telescoping fashion, in and out of its respective cylinder 186. There are normally three cylinders 186 and three arms 104 in each module 24.

At the end of each arm 104 which is external to the cylinder 186, a pair of jaws 188 are pivotally attached (see FIGS. 5A and 5B). The jaws 188 form the pincers 190. The jaws 188 are actuated by a rod 192 having a T-shaped end 194. At each end of the transverse portion of the T-shaped end 194 there is a guide pin which engages a respective slot 196 in a respective one of the jaws 188. When the rod 192 moves up relative to the external end of the arm 104, the jaws 188 are spread apart to the open position. When the rod 192 moves down relative to the external end of the arm 104, the jaws 188 are brought together to reach the closed position. The rods 192 are actuated by a pneumatic cylinders 198 which are fixed relative to the arms 104. A displacement sensor can be provided as part of each assembly including a rod 192 and a pneumatic cylinder 198 so that the degree of closing of the jaws 188 can be ascertained at all times. The pincers 190 also have a sensor such as a simple contact switch to detect when the pincers make contact with the sticks 12 as the pincers 190 are closing.

The cylinders 186 within each module 24 are supported by a module frame member 200. The frame member 200 extends between the sidewalls 72. The first end of each cylinder 186 is pivotally mounted to the frame member 200 such that the cylinder 186 can move within an envelope in the shape of a sector of a circle having its center located near the first end of the cylinder 186. In addition, the first end of each cylinder 186 is mounted in a manner that allows about ½ inch of travel for the first end of the cylinder 186 along the direction defined by the longitudinal axis of the cylinder 186. A movable guide sleeve 202 which can move slidably along the length of the cylinder 186 is provided around the outside surface of each cylinder 186. An L-shaped bar 204 is pivotally attached to the guide sleeve 202 at one end, and the other end of the L-shaped bar 204 is pivotally attached to the end of the telescoping rod of a pneumatic actuator 206. The vertex of the right angle of the L-shaped bar 204 is pivotally attached to the end of a cantilever arm 208 which projects from the sidewall 28 of the module 24. The closed end of the cylinder of the pneumatic actuator 206 is pivotally connected to a frame member 210 which extends between the sidewalls 72 of the module 24.

As the telescoping rod of the pneumatic actuator 206 extends in and out of its cylinder, the L-shaped bar 204 pivots about its attachment to the cantilever arm 208 causing the guide sleeve 202 to move in an arc. As the guide sleeve 202 moves along an arc, the cylinder 186 is caused to pivot about the pivotal attachment at the cylinder 186's first end.

A sliding contact 212 is fixed to the end of the L-shaped bar 204 which is pivotally attached to the pneumatic actuator 206. Three contact sensors 214, 216, and 218 monitor the angular deviation of the cylinder 186 from the vertical. As the cylinder 186 pivots, the sliding contact 212 moves up and down past the sensors 214, 216, and 218. Referring to FIG. 2, if the sliding contact 212 moves just past the middle sensor 216 so as to lose contact with the middle sensor 216 but is in contact with one or the other of the sensors 214 and 218, then the cylinder 186 is at one or the other extreme of its angular deviation from the vertical. If the sliding contact 212 is in contact with the bottom sensor 214 and loses contact with the middle sensor 216, then the cylinder 186 has moved past the limit of acceptable counter clockwise pivot (referring to the view in FIG. 2) for not rejecting a stick 12. If the sliding contact 212 is in contact with the top sensor 218 and loses contact with the middle sensor 216, then the cylinder 186 has moved past the limit of acceptable clockwise pivot (again in reference to the view in FIG. 2) for not rejecting a stick 12. By adjusting the size of the sliding contact 212 and/or the positions of the sensors 214, 216, and 218, an end user can set the limits of acceptable deviation of the cylinders 186 from the vertical (i.e. the limits of the deviations which will not result in the rejection of a separation stick) in accordance with the end user's needs. The sensors 214, 216, and 218 can be supported by a frame member extending between the sidewalls 72 of the module 24. Alternatively, the sensors 214, 216, and 218 can be linear tempesonics with positioning feedback from a calibrated scale.

When the stick positioners 160 and 162 have a stick in position for grasping by the arms 104, the arms 104 will extend downward until contact between the pincers 190 and the stick is detected. Contact with the spacer stick is detected when the pivotally supported end of each placement arm cylinder 186 exhibits some movement in the direction defined by the longitudinal axis of the cylinder 186. If even one of the pincers 190 fails to make contact with the stick, then the stick will be rejected in the manner that has already been described. The pincers 190 then close to grasp the stick. If even one of the pincers 190 closes too far, thus indicating a failure to grasp the stick or if the contact sensor on one of the pincers 190 fails to indicate that a stick 12 has been grasped by the pincer 190, then the stick will be rejected.

Once the stick is secured in the pincers 190, the amount of extension of each of the placement arms 104 is ascertained using linear displacement transducers or sensors (not shown) which are supported by the cylinders 186 and have sliding members which are fixed to and move with the placement arms 104. The amount of extension of each of the placement arms 104 are indicators of the warpage in the spacer stick 12 which is in the grasp of the pincers 190. The spacer stick 12 is rejected, in the manner previously described, if the amount of extension of the placement arms 104, relative to the amount of extension of the placement arms 104 for grasping an unwarped spacer stick 12, is beyond tolerable limits. If the stick 12 is found acceptable after this first test, the stick positioners 160 and 162 will retract to allow a clear path for the stick and the arms 104 down to the layer of lumber 14. However, before actually placing a separation stick on the layer of lumber 14, the arms 104 will retract just until the sensors 220 are cleared.

The apparatus 10 will then again test the stick for; acceptability under the applicable standards for warpage, twist, and crookedness. After the stick is released from the positioners 160 and 162, the cylinders 186 are placed in a "free floating" mode. The free floating mode is achieved when the pneumatic actuator 206 is vented to the atmosphere on both sides of its internal piston such that the actuator 206 no longer exerts any controlling force on the pivotal movement of the cylinders 186. If the sensors 214, 216, and 218 indicate that at least one of the cylinders 186 has deviated from the vertical to a degree in excess of the tolerable limit for deviations from the vertical, then the actuator 206 for the cylinder 186 with the greatest deviation is activated and that cylinder 186 is moved back to within the tolerable envelope of deviation. If after this repositioning all three cylinders 186 have deviations within tolerable limits, then the stick is accepted and the particular module 24 containing the cylinders 186 just described is considered ready for placing a separation stick.

Once all the modules 24 are indicated as being ready for placing a stick, the stacking machine places a layer of lumber on the stack support 18. For each module 24, the three arms 104 extend downward at the same rate until contact with the layer of lumber 14 is detected. The sensors 214, 216, and 218 continue to monitor the deviations of the cylinders 186. If during the downward travel of the arms 104 or the contact of the stick with the layer of lumber the cylinders 186 move out of the tolerable envelope, then the correction process described earlier is repeated. After contact with the layer of lumber is detected, if correction to the angular orientation of the cylinders 186 is required, then the arms 104 will be lifted off the layer of lumber a short distance and the correction process previously described will be repeated. Should more correction cycles be required, a predetermined number of correction cycles will be performed. Should the cylinders 186 still be outside the tolerable envelope after the maximum number of correction cycles have been performed, then the stick is rejected. The arms 104 will retract to the fully up position, stick positioner 162 will rotate into the position for guiding a stick to the reject trough 170, and the pincers 190 open to drop the stick into the reject trough 170. If positioning of the cylinders 186 within the tolerable envelope is achieved within the maximum allowable number of correction cycles, then the actuators 206 are operated to freeze in their current position. Then the stick is again brought into contact with the layer of lumber and the pincers 190 open to deposit the stick on the layer of lumber. During final stick placement, the pincers 190 open in an order that will have the minimum impact on the final resting position of the stick. This order of opening of the pincers 190 is based on the order in which pincer contact with the layer of lumber was detected (due to bowed sticks or non level lumber stacks). The preferred order would be for the first pincer to make contact with the layer of lumber to open first, the second pincer to make contact with the layer of lumber to open second, and the last pincer to make contact with the layer of lumber to open last. After the stick is deposited, the arms 104 retract to the fully up position and the entire stick placement operation can be repeated after a new layer of lumber is added to the lumber stack by the stacking machine.

The individual component control and sensor feed back within the feed module is through a remote input/output programmable logic controller (PLC) 222. The PLC 222 is essentially a microcomputer based controller which allows the functions required of all then components in the apparatus 10 to be implemented by appropriate software programming of the PLC 222. Microcomputer based control systems and coding the various functions described herein for the components of the apparatus 10 into a program executable by the microcomputer based control system are well known and, therefore, are not presented herein in any detail. The PLC 222 has two remote operator interfaces 224 and 226. The operator interface 226 is for the common operator control functions such as emergency stop, on/off, lumber layer length, and maximum stack height control. The interface 226 will be placed next to the stacking machine control console. The next interface unit 224 is a graphical user interface (GUI) using touch screen control with an easy to follow menu system. This will be the main interface control for all machined interactions with the operator. A partial list of functions would be toggling between automatic and manual control of all motions by a GUI simulated push button screen, an automated display of current machine cycle and status, automated fault display prioritized according to criticality and with corrections listed for each fault, and a setup screen for allowing the end user to select values for any parameter in order to configure the operation of the apparatus 10 so as to meet the requirements of the end user. The PLC 222 would also provide for a complete and comprehensive maintenance diagnostics routine that displays the maintenance activities that are required as a function of the hours of operation and the operating cycles that have been completed. The required maintenance activities can be presented in the form of checklists that must be completed. The maintenance diagnostics routine will also include a test that will check every component and sensor throughout the entire machine. The test results will be displayed reporting all failures and potential problems along with recommendations for correction of each fault encountered. The apparatus 10 can operate either in a continuous automatic manner or under manual control for specific functions.

The stacking machines typically have arms, which extend and retract to place layers of lumber on the stack support 18. Sensors are used to detect the position of the stacker arms in order to coordinate activities of the apparatus 10 with the activities of the stacking machine.

The PLC 222 controls the operation of the pneumatic components of the apparatus 10 using solenoid operated valves 228, and the PLC 222 controls the operation of the electrical components of the apparatus 10, such as the various electrical motors, using remotely operated multi-position switches 230. The solenoid operated valves 228 and the remotely operated multi-position switches 230 correspond in number to the number of pneumatic and electrical components that must be controlled. In addition, the PLC 222 receives inputs from all the sensors described above such as sensors 147, 150, etc.

Figure 7:
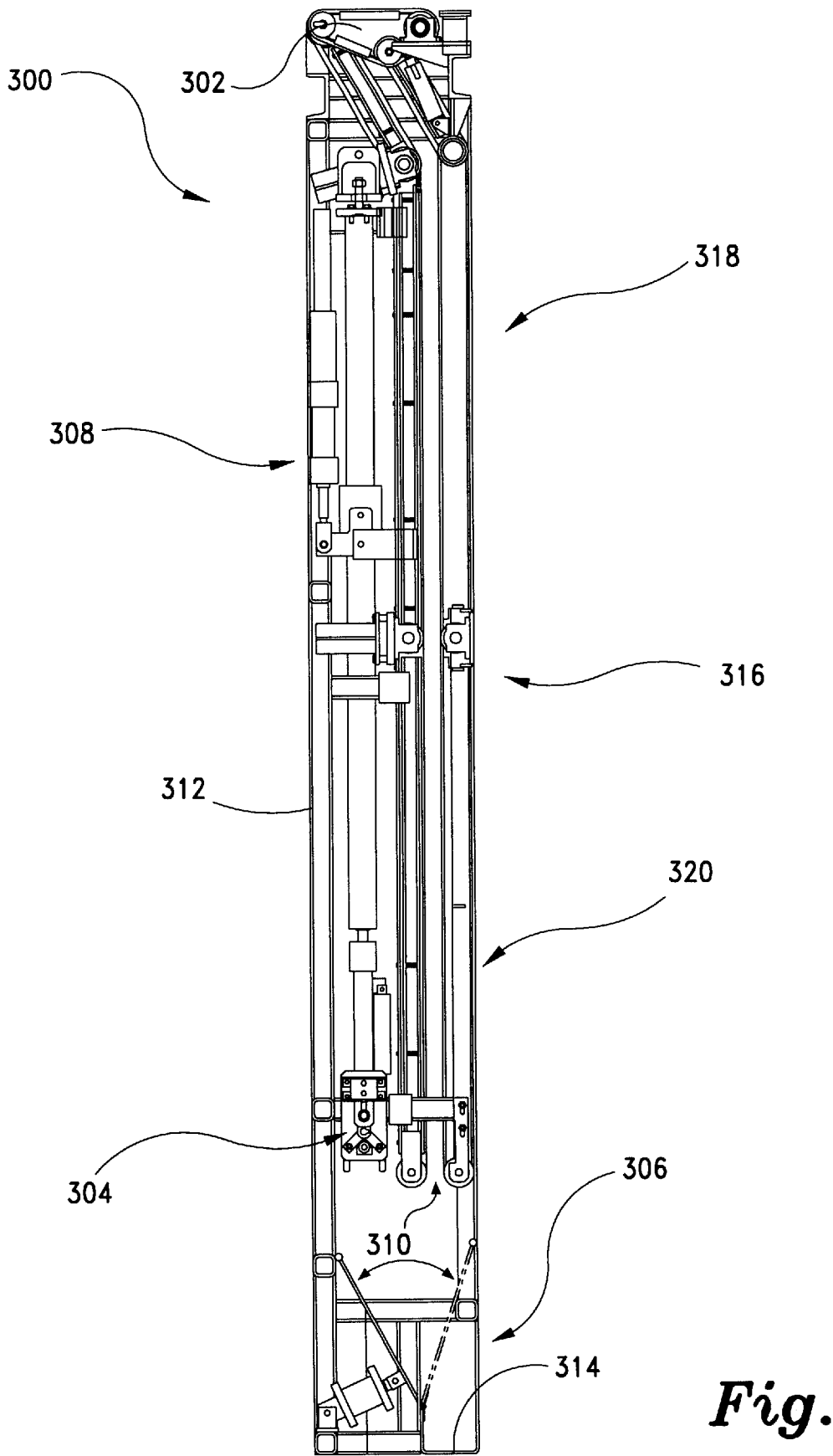
FIG. 7 is a side view of a second embodiment of the module, according to the invention.

Referring now to the alternative embodiment of the invention depicted in FIGS. 7–10B, the stick machine 10 may comprise a module 300, as particularly seen in FIG. 7, the purpose of each placement module 300 again being to place a single separation stick on each layer of lumber. However, some important additions to the alternative embodiment include a tipple 302 (previously referred to and substantially the same as the stick gate 70), a pivotal gripper assembly 304, a reject gate assembly 306, and positional envelope control assembly 308. The remaining portions of the stick machine 10 are substantially the same, though it should be understood that any conventional mechanical and electrical components necessary to adapt these changes to the preferred embodiment are herein encompassed. As before, each module 300 houses a chute 310, defined by a plurality of module chains. Most of the components shown in the side views of FIG. 7 are provided in sets of three and are arranged three abreast along a direction perpendicular to the walls.

The placement modules 300 are similarly dimensioned as before, roughly in the shape of rectangular parallelepipeds having four sidewalls 312, an open top, and a partially enclosed bottom 314. Again, the placement modules 300 are preferably supported by the walls 312. Each placement module 300 is mounted at the same height as the other modules 300, and the placement modules 300 are parallel to each other.

Each placement module 300 has a set of feed chains. The infeed section carries the sticks to the modules 300 and encompasses, in sequential order, landing chains (two sets), break down hopper chains (top and bottom hopper chains), secondary landing chains (three sets), secondary breakdown hopper chains (bottom and movable top hopper chains), and the tipple 302 (which drives and is an integral part part of the spring-loaded bottom feed chains).

The various chains and parts of the infeed section cooperate to break down the incoming bundle of sticks to force feed the sticks as a single layer onto the packet feed chains for delivery to the modules 300. Alternative embodiments of the invention may additionally comprise sensors to indicate that the space between the chains is filled with separation sticks or have stopped running.

If a misaligned stick is detected anywhere in the system, then the stop hooks, as described in the preferred embodiment, may be is used to block the path of the misaligned separation stick. The chains are then cycled in the reverse and forward directions, for a predetermined number of times, in an attempt to properly align the separation stick such that its longitudinal axis will be oriented perpendicular to the direction of the chains.

The main feed chains deliver a packet of sticks to each module 300 based on demand from furthest to nearest, detect and correct stick misalignment, and are configured in three parallel runs. Consisting of upper and lower sets of chains, the bottom feed chains are part of the tipples 302 and, while the infeed preferably comprises eight air cylinders and five motors and the main feed chain preferably comprises two motors, it should be understood that alternative embodiments of the invention may comprise any appropriate number of motors, air cylinders, sensors, and stop hooks as required to accomplish the purposes of the invention heretofore described.

The main portion of the chute 310 is primarily defined by at least four sets of chains, generally 316. Each of the sets of chains 316, preferably includes three chains arranged in parallel. Only one of the three chains in each of the sets of chains 316, can be seen in the side view of FIG. 7, because the three chains in each set of chains 316 are superimposed on one another when viewed from the side.

The sets of chains 316, comprise a first set of module chains 318 and second set of module chains 320, extending downward roughly adjacent the tipple 302. Each set of chains 316 is placed around sprockets that are supported by shafts. The sprockets, which are supported on the shaft and which are engaged to the chains 316, are supported on the shaft in a manner such that they can rotate freely and independent of the shaft. Further, the sprockets which are supported on the shaft and which are engaged to the chains 316, are fixed to and rotate with the shaft. At least one electric motors similar to the electric motor described in the preferred embodiment is arranged so as to power the rotation of the various shafts of the alternative embodiment and can be used to selectively run the chains 316 in either the forward or reverse direction, as necessary and appropriate. It should be understood that throughout the specification, wherever chains are cited, belts or any equivalent may be used in alternative embodiments, as well as the associated electronic and mechanical components necessary to support them such as conventionally known in the art.

First 318 and second 320 module chain sets each comprise at least one chain having a spring-loaded assembly means for accommodating sticks which are warped or dimensionally deviated from normal so that the chute 310 can accommodate sticks of different shapes and sizes to allow passage therethrough. Additionally, pneumatically actuated lengthwise positioning and measurement means are provided, supported by the module frame towards the bottom end of the second module chains 320, for positioning the sticks for handoff to the gripper assembly 304 after length position and measurement of the stick, though alternative embodiments may comprise any positioning and measurement means. Nevertheless, the second module chains 320 present the separation sticks for individual retrieval by the stick cylinders 340. At least one stop hook, supported by the module frame, ensures that one separation stick at a time is placed on the platform where the separation stick can be engaged.

Figure 8B:
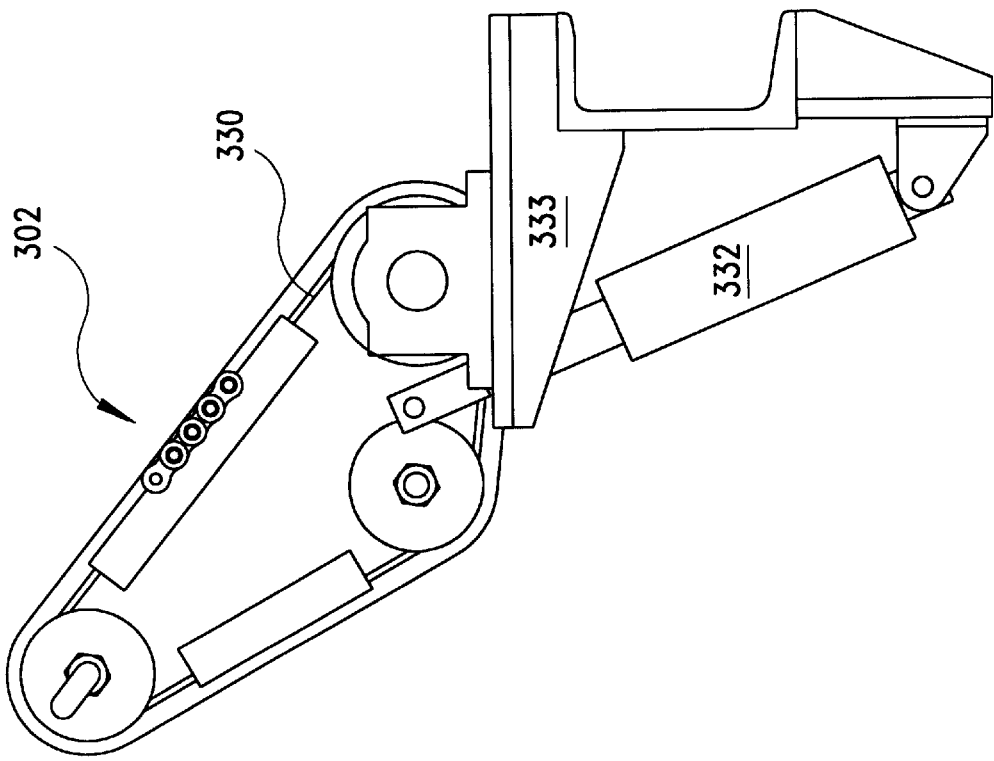
FIG. 8B is a side view of the tipple in open position, according to the invention.
Figure 8A:
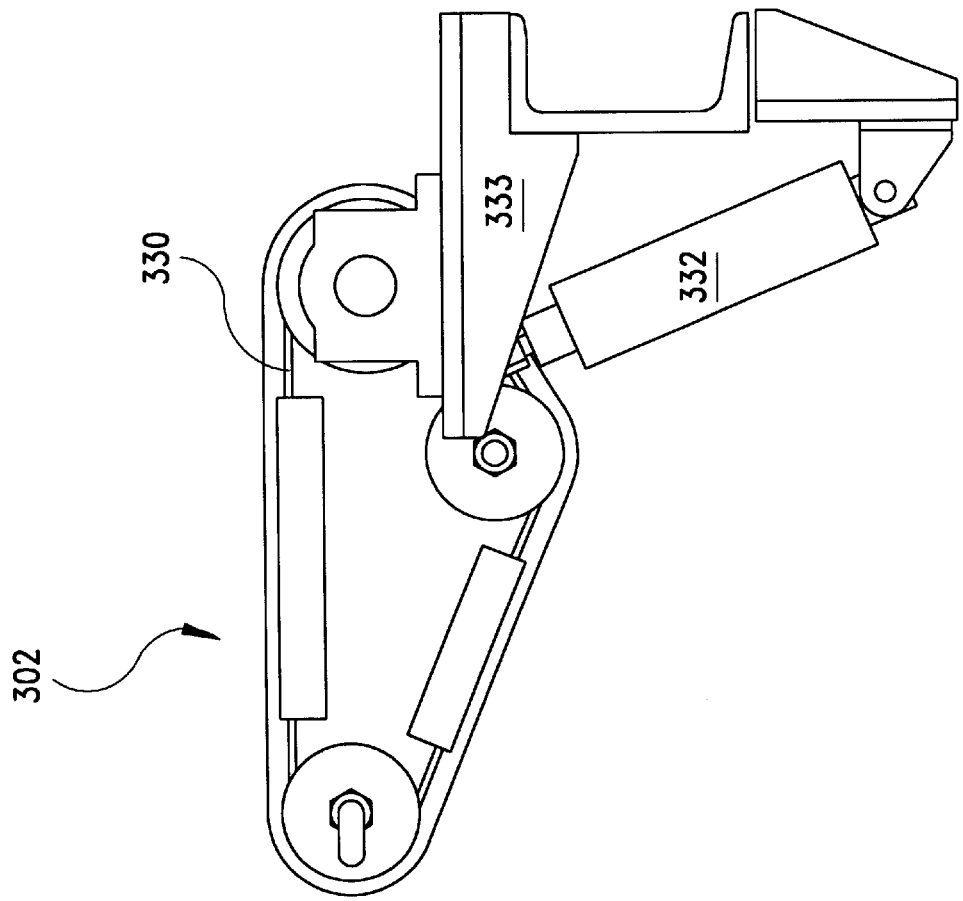
FIG. 8A is a side view of the tipple in closed position, according to the invention.

Turning now to FIGS. 8A and 8B, each stick placement module 300 has a tipple 302, controlled by a single solenoid two way/two position valve. The pivotable tipple 302 further comprises three chains 330 and includes speed adjustment means to allow for greater user control. The chains 330 are in the form of endless loops and each of the chains is supportably engaged by at least one sprocket. When the tipple 302 is closed, the upper side of its respective chains 330 are level with the upper side of the module feed chains. When the tipple 302 is closed, separation sticks are conveyed over the respective module 300 and to the feed chains of the next module 300. When the at least one pneumatic cylinder 332 pivotally moves the tipple 302 on its support frame 333 from the closed position seen in FIG. 8A to the open position in FIG. 8B, the tipple 302 opens to allow separation sticks being fed by the placement module feed chains to pass down into the respective placement module 300.

In operation, when separation sticks are being delivered to a particular placement module 300, the respective tipple 303 is raised up to allow the separation sticks to be fed into chute 310. After the separation sticks are received into the chute 310, the respective tipple 302 closes and separation sticks subsequently fed by the module feed chains are passed to the feed chains of the placement module 300 that is next in line.

Figures 9A, 9B:
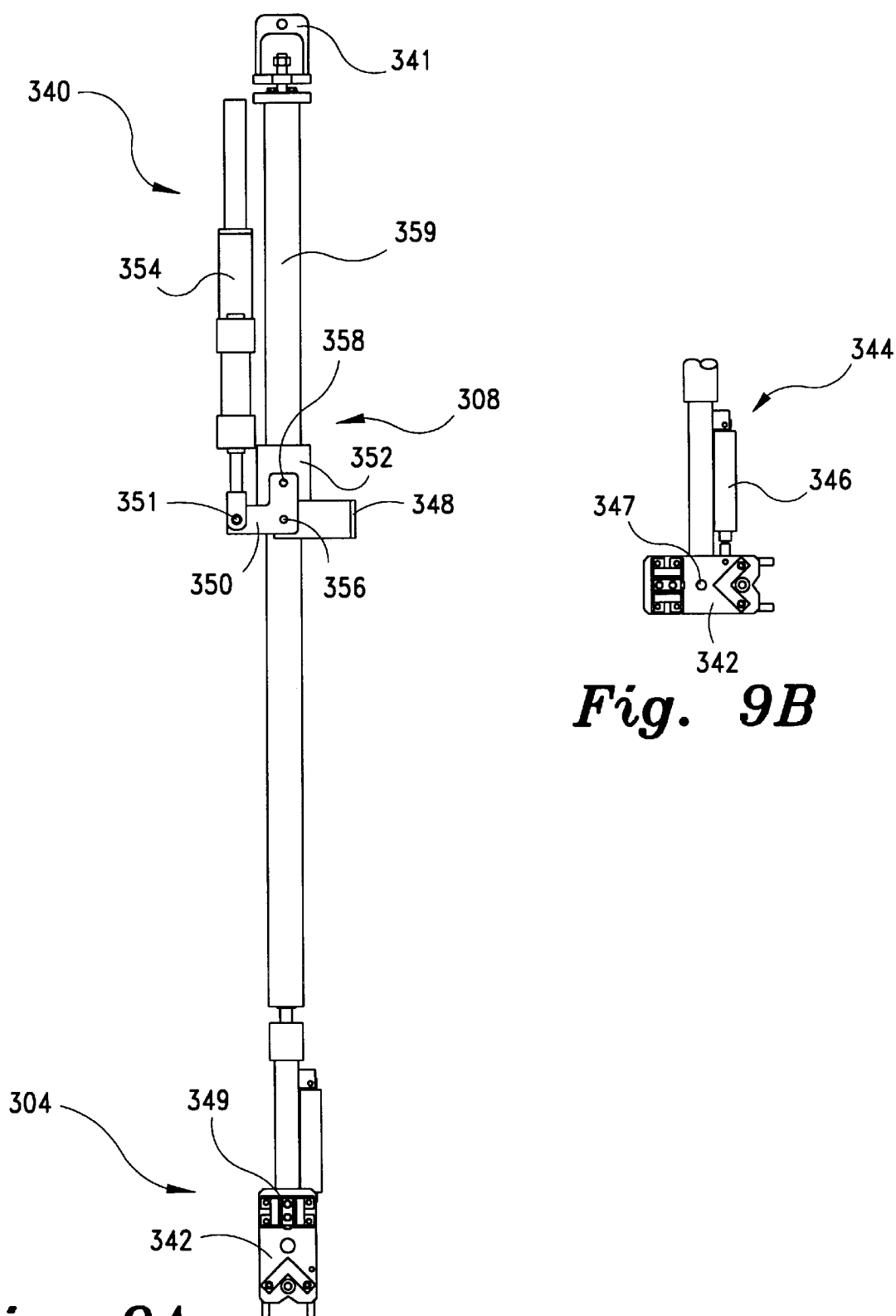
FIG. 9A is a side view of the gripper in normal position, according to the invention.
FIG. 9B is a side view of the gripper rotated 90 degrees, according to the invention.

As seen in FIG. 9A, each stick cylinder assembly 340 comprises a gripper assembly 304, vertical pivot 341, and envelope control assembly 308 which, acting together, secure each stick by a gripper 342 to place the stick within the allowed envelope on the layer of lumber. Referring in particular to the envelope control assembly 308, which is supported by the module midframe 348, three pivot points are cooperatively arranged so as to provide positional control to allow the gripper to be brought adjacent the lower portion of the second module chains 320, for receiving, holding, and grasping the stick. A generally L-shaped bracket 350, mounted in a pivot sleeve 352, comprises the three pivot points, the first pivot point pin 351 connecting the cylinder 354 (which is preferably pneumatic, though may also be a hydraulic, or an air actuated locking cylinder) to the L-shaped bracket 350. The second pivot point pin 356, connects the machine frame 348 to the L-shaped bracket 350, and the third pivot point pin 358 connects the L-shaped bracket 350, along with the cylinder 359 (which is preferably pneumatic or hydraulic), to the pivot sleeve 352. Extending and retracting the cylinder 354 causes force to be transferred through the bracket 350 such that gripper assembly 304, which is carried by the stick cylinder 340, is moved away from or towards the lower portion of the chute 310 so as to be in position to receive and grasp a stick. A linear measurement assembly using a proximity sensor and pulse wheel measures the horizontal deviation of the stick cylinder from vertical zero.

The proximity sensor allows the location of the gripper 342, which is attached to the stick cylinder 359, to be determined. The gripper assembly 304 is attached to the lower end of the stick cylinder 359 and has a non-rotating guide rod as well. A linear measurement assembly using the proximity sensor and pulse wheel measures the vertical travel from a given reference. The stick cylinder assembly 340 secures each stick by use of the gripper 342 and places it within the allowed envelope on the layer of lumber. The gripper 342 is supported by the rod end of the stick cylinder 359, allowing it to vertically extend or travel up and down as the stick cylinder retracts and extends, respectively, and can pivotally rotate 90 degrees by pivot pin assembly 347 (as illustrated in FIG. 9B) through actuation of a pneumatic air cylinder 346; to assist in opening and closing the gripper 342, at least one air cylinder is attached 349 at the end of the gripper 342. The gripper assembly 305 also includes sensors and associated electronics for determining when the gripper 342 is in open or closed position, the direction of the gripping fingers, and control. Once the stick is in position, the gripper 342 extends until sensors indicate that the stick has been contacted. At this point, the grippers 342 close firmly gripping the stick.

Figure 10B:
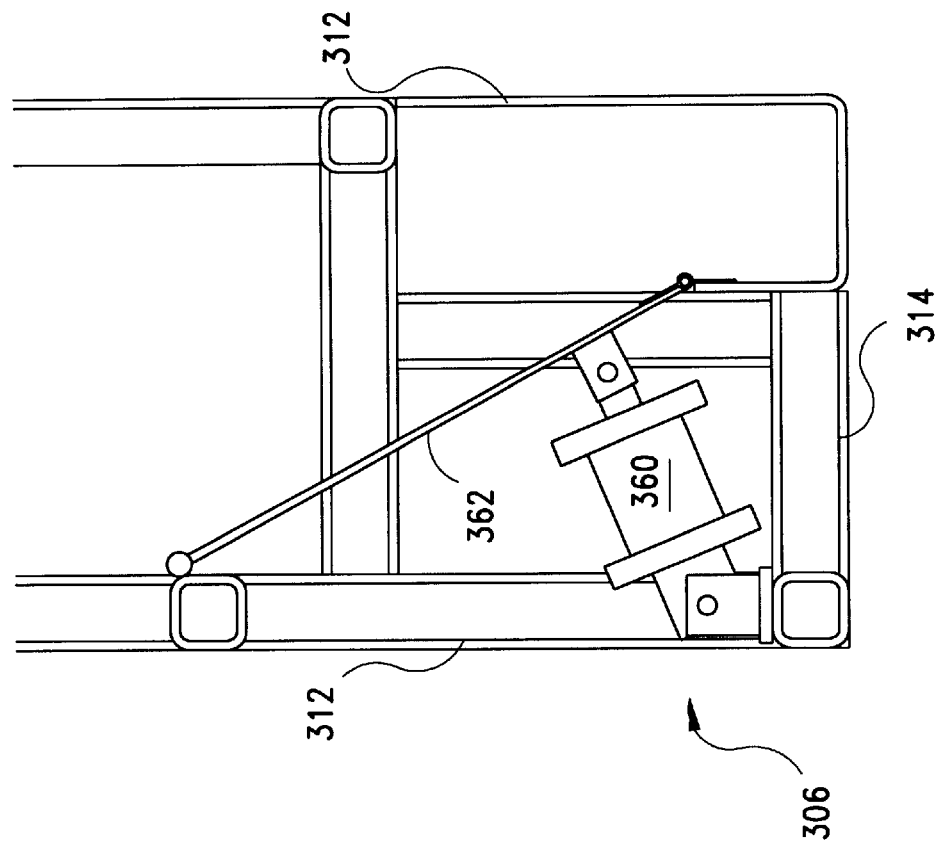
FIG. 10B is a side view of the reject gate in open position, according to the invention.
Figure 10A:
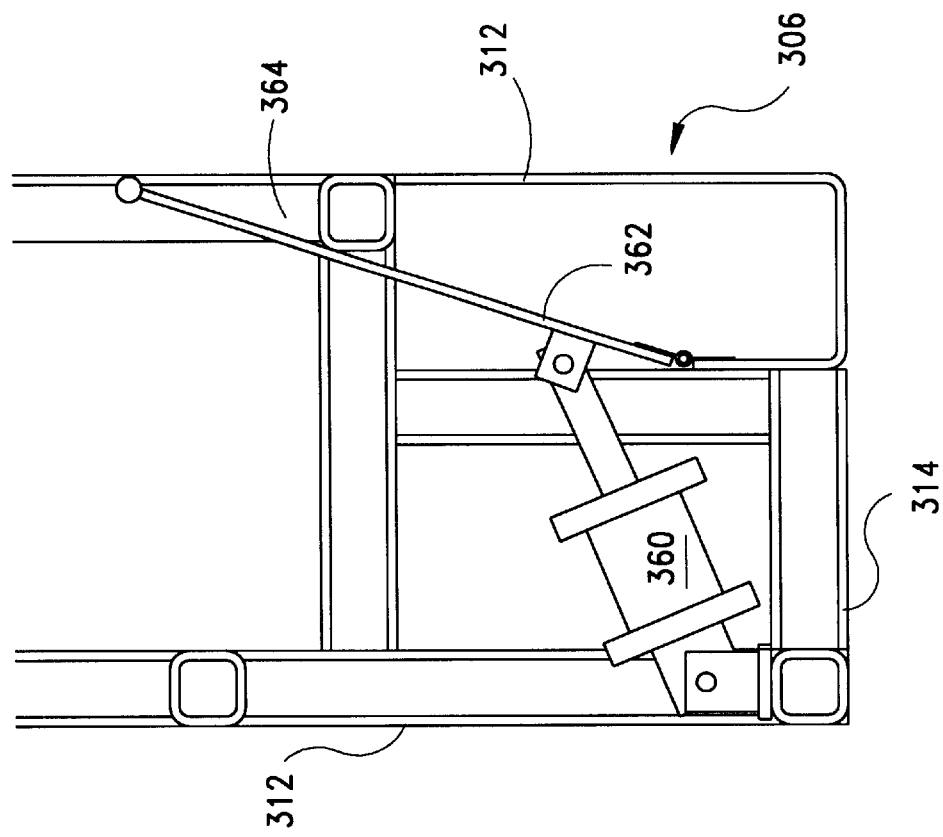
FIG. 10A is a side view of the reject gate in closed position, according to the invention.

Turning now to FIGS. 10A and 10B, the closed and open views of the reject gate 306, respectively, are seen. The reject gate 306 pivotally moves and is actuated by a pneumatic cylinder assembly 360 having at least one pneumatic cylinder and comprises a moveable gate 342 that runs the entire length of the module 300. During normal operation wherein no sticks are rejected, the gate 362 is closed to one side leaving an unobstructed path for the stick cylinder assemblies 340 to set sticks on the lumber. As sticks are determined to be rejected, the reject gate 362 pivotally opens to cover the bottom of the stick module 300 and, working in conjunction with the stick cylinder assemblies 340, the rejected stick is guided into the reject hopper 364. After the rejected stick is placed in the reject hopper 364, the gate 362 closes back to it default, closed position.

It is to be understood that the present invention is not limited to the sole embodiment described above, but encompasses any and all embodiments within the scope of the following claims.

I claim:

1. An apparatus for placing spacer sticks on a layer of lumber overlying an automatically indexed stack support which forms part of a lumber stacking machine, the apparatus for placing spacer sticks comprising:

an outer frame;

a plurality of spacer stick placement modules supported by said outer frame above a layer of lumber, said plurality of spacer stick placement modules being arranged in line, each of said plurality of spacer stick placement modules including means for placing spacer sticks on a layer of lumber; and, an overhead conveyer system for distributing spacer sticks to each of said plurality of spacer stick placement modules;

wherein each of said plurality of spacer stick placement modules further includes means for rejecting unsuitable spacer sticks.

2. The apparatus for placing spacer sticks according to claim 1, wherein said means for placing spacer sticks on a layer of lumber includes a plurality of pneumatic cylinders, each cylinder having a telescoping arm having an external end, and a plurality of selectively closable pincers, each pincer being provided at said external end of said telescoping arm of a respective one of-said plurality of pneumatic cylinders.

3. The apparatus for placing spacer sticks according to claim 2, wherein each of said plurality of pneumatic cylinders has a longitudinal axis and wherein each of said plurality of pneumatic cylinders is supported within a respective one of said plurality of spacer stick placement modules such that said longitudinal axis thereof can deviate from a vertical orientation responsive to warpage in a spacer stick grasped by a respective one of said plurality of pincers, whereby deviation of said longitudinal axis from said vertical orientation provides an indicator of an amount of warpage in the spacer stick, said plurality of pneumatic cylinders forming in part said means for rejecting unsuitable spacer sticks.

4. An apparatus for placing spacer sticks on a layer of lumber overlying an automatically indexed stack support which forms part of a lumber stacking machine, the apparatus for placing spacer sticks comprising:

an outer frame;

a plurality of spacer stick placement modules each having a module frame and supported by said outer frame above a layer of lumber, said plurality of spacer stick placement modules being arranged in line, each of said plurality of spacer stick placement modules including means for placing spacer sticks on a layer of lumber;

an overhead conveyer system for distributing spacer sticks to said plurality of spacer stick placement modules, each one of said plurality of modules further having a reject trough and a conveyance chute for conveying said sticks from said overhead conveyor system to said means for placing spacer sticks;

wherein each of said plurality of spacer stick placement modules further includes means for rejecting unsuitable spacers sticks.

5. The apparatus for placing spacer sticks according to claims 4, wherein said apparatus further comprises a plurality of tipples and an infeed hopper for funneling said sticks into said overhead conveyor system, each one of said plurality of tipples being pivotally mounted on one of said plurality of placement modules, each one of said plurality of tipples comprising a conveyor of endless construction for cooperatively conveying sticks over a respective one of said plurality of placement modules to a next one of said plurality of placement modules when in closed position and for selectively positioning and feeding sticks to said chute when in open position.

6. The apparatus for placing spacer sticks according to claim 4, wherein said apparatus further comprises at least one sensor responsive to displacement of said sticks within said apparatus and for discontinuing the conveyance of said sticks and initiating a stick misalignment correction cycle for selectively running said apparatus according to a predetermined sequence of movements and for selectively engaging at least one stop hook into the path of travel of said sticks for unscrambling said sticks and positioning said sticks into proper alignment.

7. The apparatus for placing spacer sticks according to claimed 4, wherein said apparatus further comprises at least one reject gate pivotally mounted to said module frame, said gate being selectively openable for receiving said unsuitable spacer sticks into said reject trough.

8. The apparatus for placing spacer sticks according to claims 4, wherein said means for placing spacer sticks on a layer of lumber includes at least one gripper assembly and at least one extendable stick cylinder having first and second ends;

said at least one gripper assembly including a gripper for grasping and placing a stick, said gripper being pivotally mounted to said first end of said at least one extendable stick cylinder, said second end of said at least one stick cylinder being pivotally mounted to said module frame.

9. The apparatus for placing spacer sticks according to claim 4, wherein said means for placing spacer sticks on a layer of lumber includes at least one extendable stick cylinder assembly having first and second ends;

said at least one extendable stick cylinder assembly including an envelope control assembly, a stick cylinder, and a gripper assembly having a gripper for selectively grasping and placing a stick, said gripper being pivotally mounted to said first end of said stick cylinder assembly, said second end of said stick cylinder assembly being pivotally mounted to said module frame;

said envelope control assembly being pivotally mounted to said stick cylinder for moving said stick cylinder in position for receiving a stick from said conveyor system by said gripper.

10. The apparatus for placing spacer sticks according to claim 4, wherein said means for placing spacer sticks on a layer of lumber includes a plurality of pneumatic cylinders each having a telescoping arm having an external end, and a plurality of selectively closable pincers each being provided at said external end of said telescoping arm of a respective one of said plurality of pneumatic cylinders.

11. The apparatus for placing spacer sticks according to claim 10, wherein each of said plurality of pneumatic cylinders has a longitudinal axis and wherein each of said plurality of pneumatic cylinders is supported within a respective one of said plurality of spacer stick placement modules such that said longitudinal axis thereof can deviate from a vertical orientation responsive to warpage in a spacer stick grasped by a respective one of said plurality of pincers, whereby deviation of said longitudinal axis from said vertical orientation provides an indicator of an amount of warpage in the spacer stick, said plurality of pneumatic cylinders forming in part said means for rejecting unsuitable spacer sticks.

12. An apparatus for placing spacer sticks on a layer of lumber overlying an automatically indexed stack support which forms part of a lumber stacking machine, the apparatus for placing spacer sticks comprising:

an outer frame;

an overhead conveyer system for distributing spacer sticks to a plurality of spacer stick placement modules, each of said plurality of spacer stick placement modules having a module frame supported by said outer frame above a layer of lumber, said plurality of spacer stick placement modules being arranged in line, each of said plurality of spacer stick placement modules including means for placing spacer sticks on a layer of lumber, each of said plurality of modules further having a substantially vertically disposed chute with a feed end positioned to receive sticks deposited therein by said overhead system and constructed to convey and hold said sticks side-by-side and substantially horizontal for presentation in singulated sequence to said means for placing spacer sticks on said layer of lumber;

at least one tipple pivotally mounted on a respective one of said plurality of modules, said at least one tipple comprising a conveyor of endless construction for cooperatively conveying sticks over a respective one of said plurality of modules to a succeeding one of said plurality of modules when in closed position and for selectively positioning and feeding sticks to said vertically disposed chute when in open position; and, at least one detection sensor responsive to displacement of said sticks and for discontinuing the conveyance of said sticks and initiating a stick misalignment correction cycle for selectively running said apparatus according to a predetermined sequence of movements and for selectively engaging at least one stop hook into the path of travel of said sticks for unscrambling said sticks and positioning said sticks uniformly into proper alignment;

wherein each of said plurality of spacer stick placement modules further includes means for rejecting unsuitable spacer sticks.

13. The apparatus for placing spacer sticks according to claim 12, wherein said apparatus further comprises at least one reject trough including at least one reject gate pivotally mounted to said module frame, said gate being selectively actuated for receiving said unsuitable spacer sticks into said at least one trough.

14. The apparatus for placing spacer sticks according to claim 12, wherein said means for placing spacer sticks on a layer of lumber includes at least one gripper assembly and at least one extendable stick cylinder having first and second ends;

said at least one gripper assembly including a gripper for grasping and placing a stick, said gripper being pivotally mounted to said first end of said at least one extendable stick cylinder, said second end of said at least one stick cylinder being pivotally mounted to said module frame.

15. The apparatus for placing spacer sticks according to claim 12, wherein said means for placing spacer sticks on a layer of lumber includes at least one extendable stick cylinder assembly having first and second ends;

said at least one extendable stick cylinder assembly including an envelope control assembly, a stick cylinder, and a gripper assembly having a gripper for selectively grasping and placing a stick, said gripper being pivotally mounted to said first end of said stick cylinder assembly, said second end of said stick cylinder assembly being pivotally mounted to said module frame;

said envelope control assembly being pivotally mounted to said stick cylinder for moving said stick cylinder in position for receiving a stick from said conveyor system by said gripper.

16. The apparatus for placing spacer sticks according to claim 12, wherein said means for placing spacer sticks on a layer of lumber includes a plurality of pneumatic cylinders each having a telescoping arm having an external end, and a plurality of selectively closable grippers each being provided at said external end of said telescoping arm of a respective one of said plurality of pneumatic cylinders.

17. The apparatus for placing spacer sticks according to claim 16, wherein each of said plurality of pneumatic cylinders has a longitudinal axis and wherein each of said plurality of pneumatic cylinders is supported within a respective one of said plurality of spacer stick placement modules such that said longitudinal axis thereof can deviate from a vertical orientation responsive to warpage in a spacer stick grasped by a respective one of said plurality of pincers, whereby deviation of said longitudinal axis from said vertical orientation provides an indicator of an amount of warpage in the spacer stick, said plurality of pneumatic cylinders forming in part said means for rejecting unsuitable spacer sticks.

* * * * *